United States Patent
Murayama et al.

(10) Patent No.: US 10,305,334 B2
(45) Date of Patent: May 28, 2019

(54) WIRELESS POWER-SUPPLYING SYSTEM, POWER-RECEIVING DEVICE, AND POWER-TRANSMITTING DEVICE

(71) Applicant: IHI CORPORATION, Tokyo (JP)

(72) Inventors: Takahiko Murayama, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 96 days.

(21) Appl. No.: 15/280,001

(22) Filed: Sep. 29, 2016

(65) Prior Publication Data

US 2017/0018973 A1    Jan. 19, 2017

Related U.S. Application Data

(63) Continuation of application No. PCT/JP2015/063092, filed on May 1, 2015.

(30) Foreign Application Priority Data

May 30, 2014  (JP) ................................ 2014-113452
Jun. 3, 2014   (JP) ................................ 2014-115200
Jun. 6, 2014   (JP) ................................ 2014-117711

(51) Int. Cl.
*H02J 7/02*     (2016.01)
*H02J 50/12*    (2016.01)
(Continued)

(52) U.S. Cl.
CPC ............. *H02J 50/90* (2016.02); *H02J 7/025* (2013.01); *H02J 50/12* (2016.02); *H02J 50/40* (2016.02);
(Continued)

(58) Field of Classification Search
CPC ...... H02J 17/00; H02J 7/00; H02J 7/02; H02J 7/025; H02J 7/027; H02J 50/12;
(Continued)

(56) References Cited

U.S. PATENT DOCUMENTS 9,343,928 B2 *   5/2016   Bae ...................... H04B 5/0037
2004/0201361 A1* 10/2004  Koh ...................... H02J 7/0042
                                                                320/104
(Continued)

FOREIGN PATENT DOCUMENTS

CN    102638080 A    8/2012
JP    2010-136519 A  6/2010
(Continued)

*Primary Examiner* — Fritz M Fleming
*Assistant Examiner* — Jagdeep S Dhillon
(74) *Attorney, Agent, or Firm* — Volpe and Koenig, P.C.

(57) ABSTRACT

A wireless power-supplying system includes a power-transmitting device that transmits power in a wireless manner and a power-receiving device that receives the power and supplies the received power to a load, the power-receiving device includes a switch that switches the connection to the load and a load circuit that is supplied with the power when the switch is in an open state, and the wireless power-supplying system includes a control unit that performs a position determining process of determining whether the power-transmitting device and the power-receiving device have a positional relationship in which power is suppliable to the load on the basis of at least one of power, voltage, and current in at least one of the power-transmitting device and the power-receiving device when the power is supplied to the load circuit.

11 Claims, 11 Drawing Sheets

(51) Int. Cl.
*H02J 50/90* (2016.01)
*H02J 50/40* (2016.01)
*H02J 50/80* (2016.01)
*H02M 3/335* (2006.01)

(52) U.S. Cl.
CPC ......... *H02J 50/80* (2016.02); *H02M 3/33569* (2013.01)

(58) Field of Classification Search
CPC . H02J 50/90; H01F 38/14; H04B 5/00; H04B 5/0037; H04B 5/0081
USPC ............ 307/104, 149, 9.1, 10.1, 66, 43; 320/107–109, 134–140, 157
See application file for complete search history.

(56) References Cited

U.S. PATENT DOCUMENTS

| | | | | |
|---|---|---|---|---|
| 2009/0243397 | A1* | 10/2009 | Cook | H02J 5/005 307/104 |
| 2010/0289341 | A1* | 11/2010 | Ozaki | H02J 7/025 307/104 |
| 2012/0043172 | A1 | 2/2012 | Ichikawa | |
| 2012/0235509 | A1 | 9/2012 | Ueno et al. | |
| 2012/0306286 | A1* | 12/2012 | Kim | B60L 11/182 307/104 |
| 2012/0313614 | A1* | 12/2012 | Ohshita | H02M 3/1584 323/311 |
| 2013/0099586 | A1 | 4/2013 | Kato | |
| 2013/0119930 | A1 | 5/2013 | Sakoda et al. | |
| 2013/0221758 | A1* | 8/2013 | Kai | H04B 5/0037 307/104 |
| 2013/0257165 | A1* | 10/2013 | Singh | H02J 17/00 307/98 |
| 2013/0257370 | A1 | 10/2013 | Ichikawa | |
| 2014/0084688 | A1* | 3/2014 | Tzanidis | H01F 38/14 307/42 |
| 2014/0103871 | A1* | 4/2014 | Maikawa | H02J 7/025 320/108 |
| 2014/0203662 | A1* | 7/2014 | Bae | H02J 17/00 307/104 |
| 2014/0257614 | A1 | 9/2014 | Niizuma | |
| 2014/0300202 | A1 | 10/2014 | Shimokawa | |
| 2014/0333258 | A1 | 11/2014 | Matsukura et al. | |
| 2014/0354041 | A1 | 12/2014 | Yoshi et al. | |
| 2015/0061579 | A1 | 3/2015 | Katsunaga et al. | |
| 2015/0130271 | A1 | 5/2015 | Suzuki et al. | |
| 2015/0130272 | A1 | 5/2015 | Suzuki et al. | |
| 2015/0130294 | A1 | 5/2015 | Suzuki et al. | |
| 2015/0239354 | A1 | 8/2015 | Gorai et al. | |
| 2015/0326028 | A1 | 11/2015 | Suzuki et al. | |

FOREIGN PATENT DOCUMENTS

| | | |
|---|---|---|
| JP | 2011-188679 A | 9/2011 |
| JP | 2012-005238 A | 1/2012 |
| JP | 2012-010546 A | 1/2012 |
| JP | 2012-070463 A | 4/2012 |
| JP | 2012-080770 A | 4/2012 |
| JP | 2013-027129 A | 2/2013 |
| JP | 2013-070590 A | 4/2013 |
| JP | 2013-074685 A | 4/2013 |
| JP | 2013-123306 A | 6/2013 |
| JP | 2013-128400 A | 6/2013 |
| JP | 2013-172506 A | 9/2013 |
| JP | 2013-212013 A | 10/2013 |
| JP | 2013-243882 A | 12/2013 |
| JP | 2014-103746 A | 6/2014 |
| WO | 2010/131346 A1 | 11/2010 |
| WO | 2011/132271 A1 | 10/2011 |
| WO | 2013/077340 A1 | 5/2013 |
| WO | 2013/088488 A1 | 6/2013 |
| WO | 2013/098975 A1 | 7/2013 |
| WO | 2014/041655 A1 | 3/2014 |

* cited by examiner

FIG. 13
| INDUCTANCE | IMPEDANCE |
|---|---|
| X1 | Y1 |
| X2 | Y2 |
| X3 | Y3 |
| ⋮ | ⋮ |
| Xn | Yn |
FIG. 14A
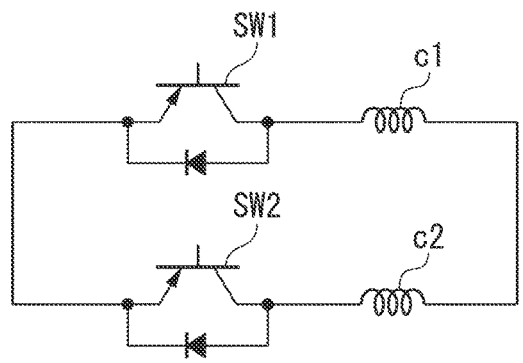
FIG. 14B
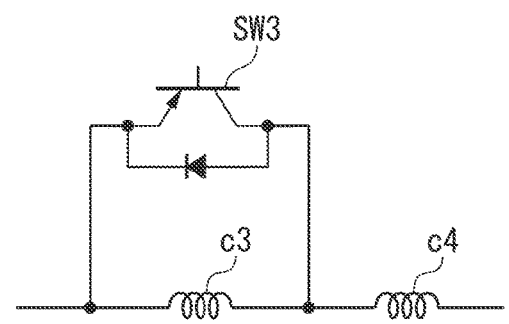

WIRELESS POWER-SUPPLYING SYSTEM, POWER-RECEIVING DEVICE, AND POWER-TRANSMITTING DEVICE

This application is a continuation application based on a PCT Patent Application No. PCT/JP2015/063092, filed on May 1, 2015, whose priority is claimed on Japanese Patent Application No. 2014-113452, filed on May 30, 2014, Japanese Patent Application No. 2014-115200, filed on Jun. 3, 2014, and Japanese Patent Application No. 2014-117711, filed on Jun. 6, 2014. The contents of both the PCT application and the Japanese Patent Application are incorporated herein by reference.

TECHNICAL FIELD

The present disclosure relates to a wireless power-supplying system, a power-receiving device, and a power-transmitting device.

BACKGROUND ART

Patent Document 1 discloses a parking support device of a vehicle which can reduce a misalignment of a parking position of a vehicle. The parking support device includes a camera, a first vehicle guiding unit that recognizes a position of a power-transmitting unit outside the vehicle using an image acquired from the camera and guides the vehicle to the power-transmitting unit, a power-receiving unit that receives power from the power-transmitting unit in a wireless manner, a second vehicle guiding unit that guides the vehicle on the basis of the power received by the power-receiving unit, and a control unit that performs a process of stopping movement of the vehicle when the power received from the power-transmitting unit by the power-receiving unit does not satisfy a first condition in spite of movement of the vehicle exceeding a predetermined distance by a vehicle drive unit after the first vehicle guiding unit is no longer able to detect the position of the power-transmitting unit in the image.

In addition, a wireless power-supplying system that supplies power from a power-transmitting device including a power-transmitting coil to a power-receiving device including a power-receiving coil using magnetism has been proposed (for example, see Patent Document 2). For example, the power-transmitting device includes a transmitting-side power converter that rectifies AC power from an AC power source and adjusts a voltage thereof, an inverter circuit that converts the power from the power converter into AC power, and a transmitting-side pad that generates a magnetic field on the basis of AC power input from the inverter circuit.

DESCRIPTION OF RELATED ART

Patent Document

[Patent Document 1]
  Japanese Unexamined Patent Application, First Publication No. 2011-188679
[Patent Document 2]
  Japanese Unexamined Patent Application, First Publication No. 2012-10546

SUMMARY

Technical Problem

In the above-mentioned background art, the misalignment between the power-receiving unit (hereinafter, referred to as power-receiving device) and the power-transmitting unit (hereinafter, referred to as power-transmitting device) is specified on the basis of the image captured by the camera. However, the camera is expensive, and an image may become unclear when a lens of the camera is dirty. Accordingly, there is a problem in that use of the camera is not desirable.

The present disclosure is conceived in view of the above-described circumstances and an object thereof is to specify a misalignment between a power-transmitting device and a power-receiving device without using a camera.

Solution to Problem

According to a first aspect of the present disclosure, there is provided a wireless power-supplying system including: a power-transmitting device that transmits power in a wireless manner; and a power-receiving device that receives the power and supplies the received power to a load, wherein the power-receiving device includes a switch that switches the connection to the load and a load circuit that is supplied with the power when the switch is in an open state, and wherein the wireless power-supplying system includes a control unit that performs a position determining process of determining whether the power-transmitting device and the power-receiving device have a positional relationship in which power is suppliable to the load on the basis of at least one of power, voltage, and current in at least one of the power-transmitting device and the power-receiving device when the power is supplied to the load circuit.

A second aspect of the present disclosure provides the wireless power-supplying system according to the first aspect, wherein the control unit controls the power-transmitting device so as to output a lower voltage when the load circuit is supplied with power compared to a case in which the load is supplied with power.

A third aspect of the present disclosure provides the wireless power-supplying system according to the first or second aspect, wherein impedance of the load circuit is a rated impedance of the load.

A fourth aspect of the present disclosure provides the wireless power-supplying system according to any one of the first to third aspects, wherein the power-transmitting device includes: a transmitting-side power converter that converts power supplied from the outside into DC power; and an inverter circuit that converts the DC power from the transmitting-side power converter into AC power, and wherein the control unit performs the position determining process on the basis of at least one of power, voltage, and current in the transmitting-side power converter or the inverter circuit.

A fifth aspect of the present disclosure provides the wireless power-supplying system according to the fourth aspect, wherein the control unit calculates input power on the basis of a voltage and a current of a voltage converter or the inverter circuit and performs the position determining process on the basis of the input power.

A sixth aspect of the present disclosure provides the wireless power-supplying system according to the fourth aspect, wherein the control unit calculates output power on the basis of a voltage and a current of the load circuit and performs the position determining process on the basis of the output power.

A seventh aspect of the present disclosure provides the wireless power-supplying system according to the fourth aspect, wherein the control unit calculates input power on the basis of a voltage and a current of the transmitting-side power converter or the inverter circuit, calculates output power on the basis of a voltage and a current of the load circuit, calculates power efficiency on the basis of the input power and the output power, and performs the position determining process on the basis of the power efficiency.

An eighth aspect of the present disclosure provides the wireless power-supplying system according to the fourth aspect, wherein the control unit performs the position determining process on the basis of a voltage of the load circuit.

A ninth aspect of the present disclosure provides the wireless power-supplying system according to the fourth aspect, wherein the control unit performs the position determining process on the basis of a current of the load circuit.

A tenth aspect of the present disclosure provides the wireless power-supplying system according to the fourth aspect, wherein the control unit calculates transmitting-side input impedance on the basis of a voltage and a current input to the inverter circuit and performs the position determining process on the basis of the transmitting-side input impedance.

An eleventh aspect of the present disclosure provides the wireless power-supplying system according to the tenth aspect, wherein the control unit determines that the power-transmitting device and the power-receiving device have a positional relationship in which power is not suppliable to the load when the transmitting-side input impedance is greater than an upper limit which is determined on the basis of a withstanding voltage of an element in the wireless power-supplying system.

A twelfth aspect of the present disclosure provides the wireless power-supplying system according to the tenth or eleventh aspect, wherein the control unit determines that the power-transmitting device and the power-receiving device have a positional relationship in which power is not suppliable to the load when the transmitting-side input impedance is less than a lower limit which is determined on the basis of a heatproof temperature of an element in the wireless power-supplying system.

A thirteenth aspect of the present disclosure provides the wireless power-supplying system according to the fourth aspect, wherein the control unit performs the position determining process on the basis of a phase difference between the voltage and the current output from the inverter circuit.

According to another aspect of the present disclosure, a power-receiving device for receiving power from a power-transmitting device in a wireless manner and for supplying the power to a load, the power-receiving device includes: a switch that switches the connection to the load; a load circuit that is supplied with the power when the switch is in an open state; and a control unit that performs a position determining process of determining whether the power-transmitting device and the power-receiving device have a positional relationship in which power is suppliable to the load on the basis of at least one of power, voltage, and current in the power-receiving device when the power is supplied to the load circuit.

According to still another aspect of the present disclosure, there is provided a power-transmitting device that transmits power in a wireless manner to a power-receiving device supplying power to a load, including a load circuit, and supplying the power to the load circuit, the power-transmitting device including a control unit that performs a position determining process of determining whether the power-transmitting device and the power-receiving device have a positional relationship in which power is suppliable to the load on the basis of at least one of power, voltage, and current in the power-transmitting device when the power is supplied to the load circuit.

According to a fourteenth aspect of the present disclosure, a power-receiving device that receives power from a power-transmitting device in a wireless manner includes: a power converter that converts power from the power-transmitting device into power to be supplied to a load device; a switch that is disposed between the power converter and the load device; and a control unit that opens the switch to open the connection between the power converter and the load device and determines whether a voltage of the power converter induced from transmission of power from the power-transmitting device is equal to or greater than a power-suppliable threshold value.

A fifteenth aspect of the present disclosure provides the power-receiving device according to the fourteenth aspect, wherein a voltage of the power transmitted from the power-transmitting device when the switch is opened is lower than a voltage of the power transmitted from the power-transmitting device when the switch is closed.

A sixteenth aspect of the present disclosure provides the power-receiving device according to the fourteenth or fifteenth aspect, wherein the power converter includes a rectifier circuit that rectifies power from the power-transmitting device and the voltage of the power converter is an output voltage of the rectifier circuit.

A wireless power-supplying system according to the present disclosure includes the power-receiving device according to any one of the fourteenth to sixteenth aspects and a power-transmitting device that transmits power to the power-receiving device in a wireless manner.

According to a seventeenth aspect of the present disclosure, there is provided a power-transmitting device including an inverter circuit that converts DC power into AC power and a transmitting-side pad that generates a magnetic field on the basis of the AC power and supplying power to a power-receiving device in a wireless manner, the power-transmitting device including: a control unit that determines whether a power efficiency linked value which is information indicated by input power or output power of the inverter circuit and is linked with power efficiency in the supplying of power is within a range in which specified power efficiency is obtainable.

An eighteenth aspect of the present disclosure provides the power-transmitting device according to the seventeenth aspect, wherein the control unit adjusts at least one of inductance and capacitance of the transmitting-side pad so that the power efficiency linked value is within the range, when the power efficiency linked value will be not within the range.

A nineteenth aspect of the present disclosure provides the power-transmitting device according to the seventeenth or eighteenth aspect, wherein the power efficiency linked value is input impedance of the inverter circuit.

A twentieth aspect of the present disclosure provides the power-transmitting device according to the seventeenth or eighteenth aspect, wherein the power efficiency linked value is output impedance of the inverter circuit.

A twenty-first aspect of the present disclosure provides the power-transmitting device according to the seventeenth or eighteenth aspect, wherein the power efficiency linked value is a phase difference between an output voltage and an output current of the inverter circuit.

A twenty-second aspect of the present disclosure provides the power-transmitting device according to any one of the seventeenth to twenty-first aspects, wherein the range is a range in which specified power efficiency is obtainable and in which it is possible that a withstanding voltage of an element of at least one of the inverter circuit and the transmitting-side pad is not exceeded.

Effects

According to the present disclosure, it is possible to specify a misalignment between a power-transmitting device and a power-receiving device without using a camera.

BRIEF DESCRIPTION OF DRAWINGS

FIG. 13 is a schematic diagram showing a data table in the power-transmitting device according to the third embodiment of the present disclosure.

FIG. 14A is a diagram showing a variant example of the power-transmitting device according to the third embodiment of the present disclosure.

FIG. 14B is a diagram showing a variant example of the power-transmitting device according to the third embodiment of the present disclosure.

DESCRIPTION OF EMBODIMENTS

Hereinafter, a first embodiment of the present disclosure will be described with reference to the accompanying drawings.

Figure 1:
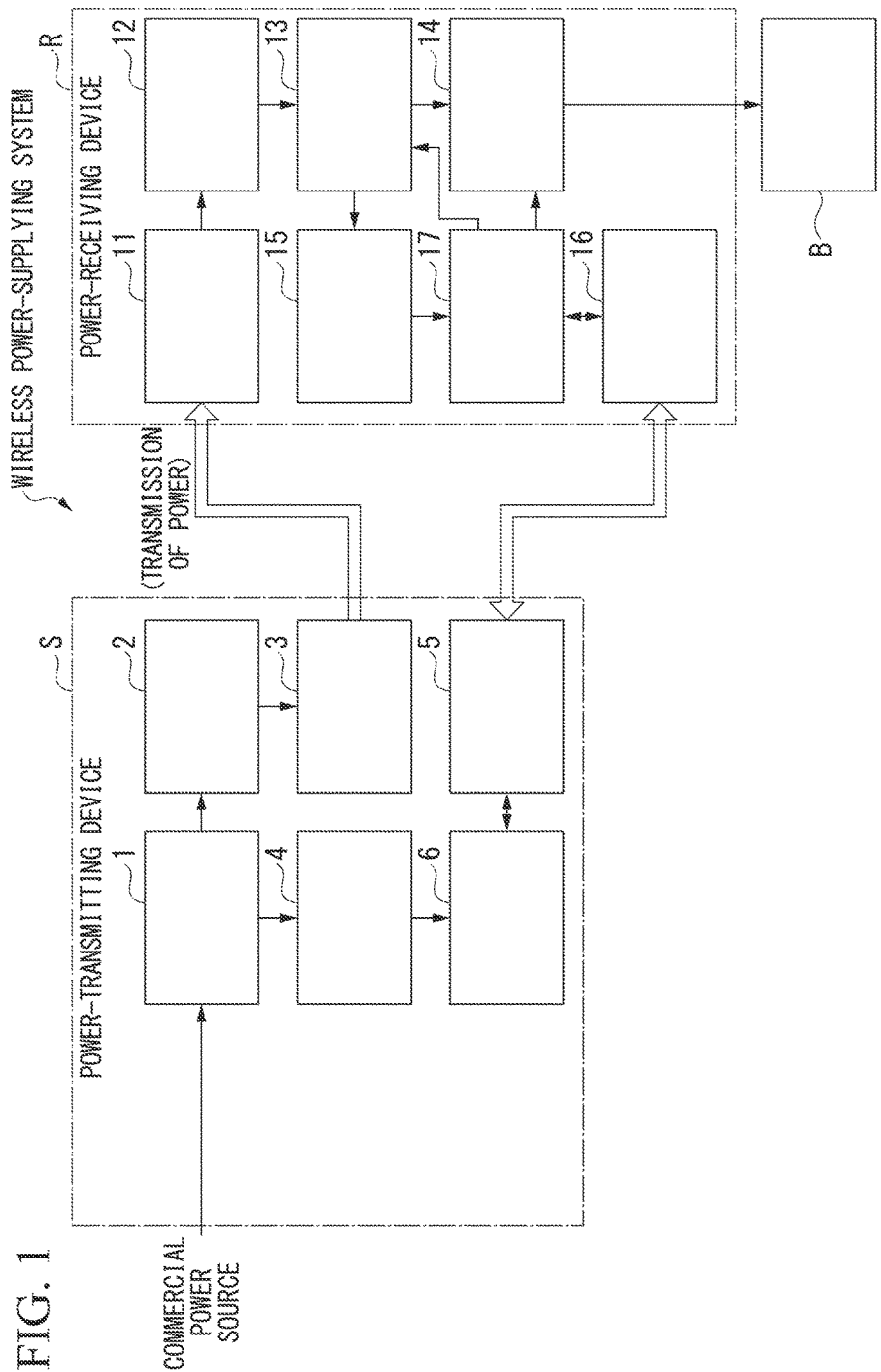
FIG. 1 is a functional block diagram of a wireless power-supplying system according to a first embodiment of the present disclosure.
Figure 2:
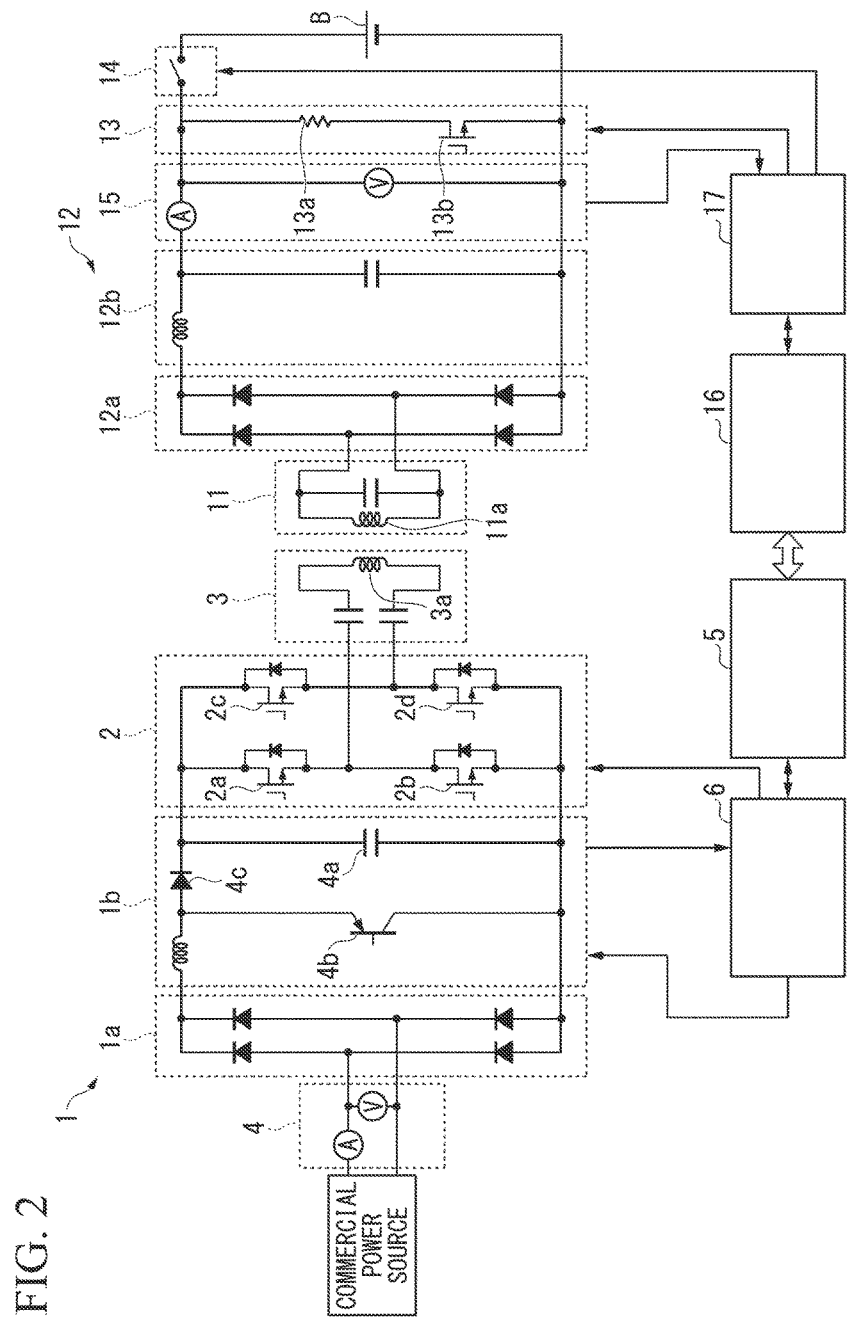
FIG. 2 is a circuit diagram of the wireless power-supplying system according to the first embodiment of the present disclosure.

A wireless power-supplying system according to this embodiment includes a power-transmitting device S and a power-receiving device R as shown in FIGS. 1 and 2. As shown in the drawings, the power-transmitting device S includes a transmitting-side power converter 1, an inverter circuit 2, a transmitting-side pad 3, a transmitting-side sensor 4, a transmitting-side communication unit 5, and a transmitting-side control unit 6. Examples of an application of the wireless power-supplying system include a charging system or a driving system of electric vehicles, home appliances, and medical devices, and a moving body such as an electric vehicle is used as a target to be supplied with power in this embodiment.

On the other hand, the power-receiving device R includes a receiving-side pad 11, a receiving-side power converter 12, a load circuit 13, a switch 14, a receiving-side sensor 15, a receiving-side communication unit 16, and a receiving-side control unit 17. One or both of the transmitting-side control unit 6 and the receiving-side control unit 17 constitutes a control unit in this embodiment.

The power-transmitting device S is a device that is fixed to a power-supplying facility installed on the ground and supplies AC power to a power-receiving device R disposed in a moving body in a wireless manner. The power-supplying facility is a facility which is provided with one or more stop spaces for a moving body and which includes the power-transmitting devices S corresponding to the number of stop spaces. On the other hand, the power-receiving device R is a device which is mounted on a moving body and which charges a battery B (variable load) by converting AC power supplied from the power-transmitting device S into DC power. The moving body is, for example, a vehicle which requires reception of power from the outside, such as an electric vehicle or a hybrid vehicle.

In the power-transmitting device S, the transmitting-side power converter 1 includes a transmitting-side rectifier circuit 1a and a chopper circuit 1b.

The transmitting-side rectifier circuit 1a is, for example, a diode bridge and serves to full-wave rectify commercial power (for example, single-phase 100 volts, 50 Hz) supplied from an external commercial power source and to output the rectified power to the chopper circuit 1b. The power (full-wave rectified power) supplied from the transmitting-side rectifier circuit 1a to the chopper circuit 1b is a unipolar (for example, positive polarity) pulsating flow in which sinusoidal commercial power is folded back at a zero-crossing point.

The chopper circuit 1b adjusts its output voltage and outputs the adjusted output voltage to the inverter circuit 2 by allowing the transmitting-side control unit 6 to control its switching operation. Specifically, the chopper circuit 1b is a step-up chopper circuit or a step-up/down chopper circuit and serves to step up/down a voltage input from the transmitting-side rectifier circuit 1a and to output the stepped-up/down voltage. The output of the chopper circuit 1b is DC power in which the full-wave rectified power as a pulsating flow is sufficiently smoothed by the function of a capacitor disposed at an output terminal of the chopper circuit 1b.

The chopper circuit 1b also serves as a power factor correction (PFC) circuit by allowing the transmitting-side control unit 6 to control its switching operation. That is, the chopper circuit 1b extends a current-flowing period of a current of the full-wave rectified power to correct a power factor by switching the full-wave rectified power at a frequency sufficiently higher than the frequency of the full-wave rectified power with respect to the zero-crossing point of the full-wave rectified power. Since it is generally known that the chopper circuit 1b serves as the power factor correction circuit, details of the principle of power factor correction of the chopper circuit 1b will not be described herein.

The inverter circuit 2 is a power converter circuit that converts DC power supplied from the transmitting-side rectifier circuit 1a into AC power of a predetermined frequency (driving frequency) on the basis of a switching signal (inverter driving signal) input from the transmitting-side control unit 6. That is, the inverter circuit 2 converts DC power into AC power through switching using the driving frequency by driving a plurality of switching elements in response to the inverter driving signal. The inverter circuit 2 outputs the AC power to the transmitting-side pad 3.

The transmitting-side pad 3 is, for example, a resonance circuit including a power-transmitting coil 3a and a power-transmitting capacitor, and generates a magnetic field on the basis of the AC power supplied from the inverter circuit 2. Among the power-transmitting coil 3a and the power-transmitting capacitor, the power-transmitting coil 3a is disposed at a position facing a predetermined position (position at which a power-receiving coil 11a is disposed) of a moving body which stops in the stop space.

The transmitting-side sensor 4 detects a current and a voltage of the power supplied from a commercial power source to the transmitting-side rectifier circuit 1a, and outputs a detection signal indicating the detected current and the detected voltage to the transmitting-side control unit 6. For example, a sensor that measures a magnetic field generated around a wire through which a current flows using the Hall effect or a sensor that measures a potential drop generated in a resistor which is inserted into a wire through which a current passes can be used as the current sensor. For example, a sensor that divides a voltage using a resistor and converts the voltage into a digital value using an analog-to-digital (AD) converter can be used as the voltage sensor.

The transmitting-side communication unit 5 performs short-range wireless communication with the receiving-side communication unit 16 of the power-receiving device R. The communication system between the transmitting-side communication unit 5 and the receiving-side communication unit 16 is a short-range wireless communication system such as ZigBee (registered trademark) or Bluetooth (registered trademark) or a short-range optical communication system using an optical signal. The transmitting-side communication unit 5 includes an antenna in a communication system using radio waves, and includes a light-emitting element and a light-receiving element for communication in a communication system using an optical signal.

The transmitting-side control unit 6 includes a central processing unit (CPU), a read only memory (ROM), a random access memory (RAM), and an interface circuit that transmits and receives various signals to and from units which are mutually electrically connected to each other. The transmitting-side control unit 6 controls the entire operations of the power-transmitting device S by performing various operation processes and communicating with the units on the basis of various operation control programs stored in the ROM. Details of the operation of the transmitting-side control unit 6 will be described later.

On the other hand, the receiving-side pad 11 in the power-receiving device R is, for example, a resonance circuit including a power-receiving coil 11a and a power-receiving capacitor and receives power via the magnetic field generated by the transmitting-side pad 3. The power-receiving coil 11a is disposed in the bottom, the side, the top, or the like of a moving body, and closely faces the power-transmitting coil 3a constituting the power-transmitting device S when the moving body stops in a stop space.

The power-receiving coil 11a of the receiving-side pad 11 closely faces the power-transmitting coil 3a constituting the transmitting-side pad 3 and is magnetically coupled thereto. That is, the receiving-side pad 11 receives AC power supplied to the power-transmitting coil 3a by the inverter circuit 2 and AC power based on the coupling coefficient between the power-transmitting coil 3a and the power-receiving coil 11a from the transmitting-side pad 3 in a wireless manner and outputs the received AC power to the receiving-side rectifier circuit 12a. That is, the wireless power-supplying system is a wireless power-supplying system based on an electromagnetic induction system. The above-mentioned embodiment is a wireless power-supplying system based on the electromagnetic induction system, but the present disclosure can be applied to a magnetic-field resonance system.

In the power-receiving device R, the receiving-side power converter 12 includes a receiving-side rectifier circuit 12a and a filter circuit 12b.

The receiving-side rectifier circuit 12a is constituted, for example, by a diode bridge and serves to full-wave rectify AC power (received power) supplied from the receiving-side pad 11 and to output the rectified AC power to the filter circuit 12b. The power supplied from the receiving-side rectifier circuit 12a to the filter circuit 12b is full-wave rectified power which is full-wave rectified by the diode bridge.

The filter circuit 12b includes, for example, a reactor and a capacitor, removes noise from the full-wave rectified power supplied from the receiving-side control unit 17, and smooths and outputs the full-wave rectified power to the battery B.

Figure 4:
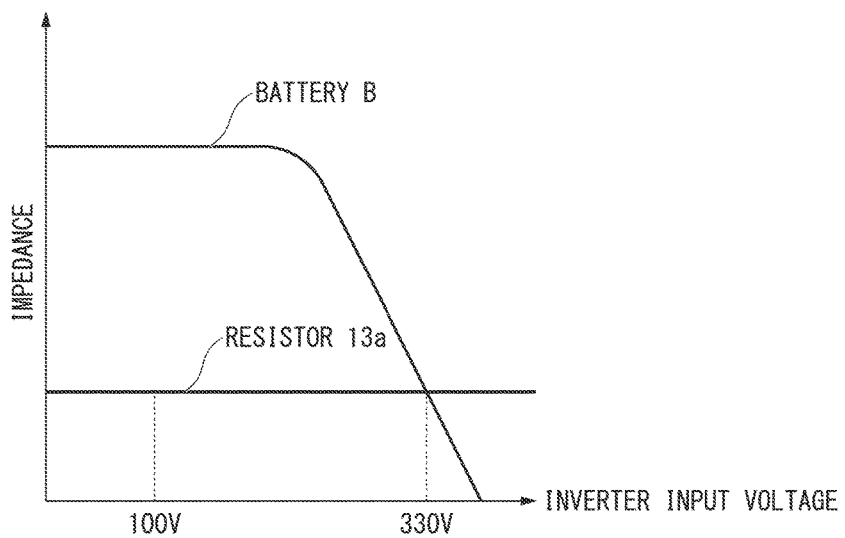
FIG. 4 is a graph showing impedance versus voltage of a reactor 13a and a battery B in the wireless power-supplying system according to the first embodiment of the present disclosure.

The load circuit 13 is disposed between the filter circuit 12b and the switch 14 and includes, for example, a resistor (fixed load) 13a and a switching element 13b. In the load circuit 13, the switching element 13b is switched to an ON state and an OFF state under the control of the receiving-side control unit 17. For example, the switching element 13b is switched to the ON state in an inspection mode to be described later. The resistor 13a is preferably set to rated impedance of the battery B. The rated impedance is a range of impedance which is possible in a desired use condition of the battery B. For example, when the voltage of the battery B is 300 [V] and desired supply power is 3 [kW], a current of 10 [A] flows in the battery B and thus the impedance of the battery B is 30 [Ω]. Since the voltage of the battery B varies with the state of charge (SOC) thereof, the impedance of the battery B varies accordingly (FIG. 4). When desired power is supplied to the battery B, the range of impedance of the battery B is rated impedance. If the impedance of the resistor 13a is the rated impedance of the battery B, the impedance is an arbitrary fixed value of the rated impedance having a range.

The switch 14 is disposed between the load circuit 13 and the battery B, is switched to an ON state and an OFF state under the control of the receiving-side control unit 17, and is embodied by an element having a circuit switching function, such as a switch, an electromagnetic contactor, or a breaker. The switch 14 is disposed, for example, to protect the battery B from an overcurrent and an overvoltage.

The receiving-side sensor 15 detects a current and a voltage of the DC power supplied from the filter circuit 12b to the load circuit 13, and outputs a detection signal indicating the detected current and the detected voltage to the receiving-side control unit 17. For example, a sensor that measures a magnetic field generated around a wire through which a current flows using the Hall effect or a sensor that measures a potential drop generated in a resistor which is inserted into a wire through which a current passes can be used as the current sensor. For example, a sensor that divides a voltage using a resistor and converts the voltage into a digital value using an analog-to-digital (AD) converter can be used as the voltage sensor.

The receiving-side communication unit 16 performs short-range wireless communication with the transmitting-side communication unit 5 of the power-transmitting device S. The communication system between the transmitting-side communication unit 5 and the receiving-side communication unit 16 is a short-range wireless communication system such as ZigBee (registered trademark) or Bluetooth (registered trademark) or a short-range optical communication system using an optical signal. The receiving-side communication unit 16 includes an antenna in a communication system using radio waves, and includes a light-emitting element and a light-receiving element for communication in a communication system using an optical signal.

The receiving-side control unit 17 includes a central processing unit (CPU), a read only memory (ROM), a random access memory (RAM), and an interface circuit that transmits and receives various signals to and from units which are mutually electrically connected to each other. The receiving-side control unit 17 controls the entire operations of the power-receiving device R by performing various operation processes and communicating with the units on the basis of various operation control programs stored in the ROM. Details of the operation of the receiving-side control unit 17 will be described later.

The battery B is a secondary battery such as a lithium ion battery or a nickel hydrogen secondary battery and is charged with DC power supplied from the receiving-side rectifier circuit 12a to accumulate the DC power. The battery B is connected to an inverter (running inverter) that drives a running motor of a moving body or/and a control device that controls running of the moving body and supplies driving power to the running inverter or the control device.

The operation of the wireless power-supplying system having the above-mentioned configuration will be described below in detail with reference to FIGS. 3 and 4.

In the wireless power-supplying system, the receiving-side control unit 17 of the power-receiving device R of a moving body switches the switch 14 and the switching element 13b of the load circuit 13 to the OFF states at the time of non-supply of power (for example, when a drive normally drives the moving body). On the other hand, the transmitting-side control unit 6 of the power-transmitting device S stops the chopper circuit 1b and the inverter circuit 2 at the time of non-supply of power, that is, when the moving body to be supplied with power does not stop at a parking or stop position. The transmitting-side control unit 6 causes the transmitting-side communication unit 5 to transmit a power-transmitting device notification signal. The power-transmitting device notification signal is a signal for notifying a surrounding power-receiving device R of presence of the power-transmitting device S.

The driver drives the moving body to move the moving body to a position at which the power-transmitting device S is disposed and to stop the moving body at the position. As a result, the power-transmitting device notification signal from the power-transmitting device S is input to the receiving-side control unit 17 via the receiving-side communication unit 16. When the power-transmitting device notification signal is input, the receiving-side control unit 17 is set to an inspection mode. The inspection mode is an operating mode for supplying power to the load circuit 13 from the power-transmitting device S to the power-receiving device R in order to specify a misalignment between the power-transmitting device S and the power-receiving device R. In the inspection mode, the power-transmitting device S can supply power to the load circuit 13 with a voltage lower than that in a power-supplying mode (an operating mode for supplying power to the battery B). Accordingly, in the inspection mode, it is possible to suppress a possibility that constituent elements of the power-transmitting device S and the power-receiving device R will be destroyed due to application of a high voltage. In this embodiment, the misalignment means a positional relationship between the power-transmitting device S and the power-receiving device R in which power is not suppliable. A situation in which power is not suppliable is an item which can be appropriately set depending on the specifications of the wireless power-supply system, such as a situation in which power is not perfectly supplied to the power-receiving device R, a situation in which power supplied to the power-receiving device R is less than a desired value, a situation in which power efficiency supplied to the power-receiving device R is less than a desired value.

Figure 3:
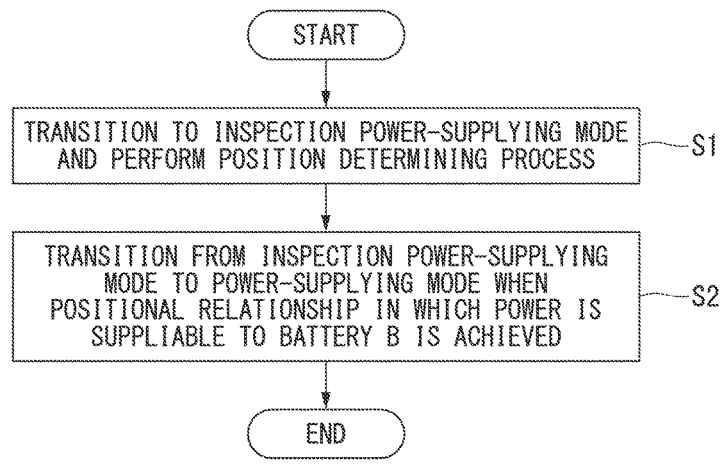
FIG. 3 is a flowchart showing an operation of the wireless power-supplying system according to the first embodiment of the present disclosure.

The receiving-side control unit 17 switches the switch 14 to an open state (the OFF state), switches the load circuit 13 from a disconnected state (the OFF state of the switching element 13b) to a connected state (the ON state of the switching element 13b), supplies power from the power-transmitting device S to the power-receiving device R with a voltage lower than that in the power-supplying mode, and performs a position determining process of determining whether the power-transmitting device S and the power-receiving device R have a positional relationship in which power is suppliable to the battery B on the basis of power, voltage, or current in at least one of the power-transmitting device S and the power-receiving device R (step S1 in FIG. 3). The receiving-side control unit 17 causes the receiving-side communication unit 16 to transmit a response signal (a signal instructing the power-transmitting device S to supply power to the load circuit 13) to the power-transmitting device notification signal to the power-transmitting device S. The present disclosure is not limited to the configuration in which the voltage of the power output from the power-transmitting device S in the inspection mode is lower than that in the power-supplying mode.

When the transmitting-side communication unit 5 receives the response signal to the power-transmitting device notification signal, the transmitting-side control unit 6 controls the chopper circuit 1b and the inverter circuit 2 so as to supply power with a voltage (for example, 100 V) lower than a voltage (for example, 330 V) which is suppliable to the battery B.

The power-receiving device R is provided with the load circuit 13 to protect the circuits of the power-transmitting device S and the power-receiving device R.

For example, the receiving-side control unit 17 performs the position determining process on the basis of at least one of the following eight methods.

First, the receiving-side control unit 17 calculates input power (power input to the transmitting-side power converter 1 or the inverter circuit 2) on the basis of the voltage and the current of the transmitting-side power converter 1 or the inverter circuit 2, calculates output power (power supplied to the load circuit 1) on the basis of the voltage and the current of the load circuit 13, calculates power efficiency on the basis of the input power and the output power, and performs the position determining process on the basis of the power efficiency. For example, when the power efficiency is equal to or greater than a threshold value, the receiving-side control unit 17 determines that the power-transmitting device S and the power-receiving device R have a positional relationship in which power is suppliable to the battery B. The voltage and the current of the transmitting-side power converter 1 or the inverter circuit 2 is a voltage and a current input to the transmitting-side rectifier circuit 1a, the chopper circuit 1b, or the inverter circuit 2 or a voltage and a current output from the three circuits. Accordingly, the input power based on the voltage and the current of the transmitting-side power converter 1 or the inverter circuit 2 is power at an input terminal or an output terminal of at least one circuit of the three circuits. The voltage and the current of the load circuit 13 is a voltage applied across the load circuit 13 and a current flowing in the load circuit 13. Accordingly, the output power based on the voltage and the current of the load circuit 13 is power which is consumed in the load circuit 13.

The receiving-side control unit 17 acquires information on the voltage and the current of the transmitting-side power converter 1 or the inverter circuit 2 by communication between the power-transmitting device S and the power-receiving device R. In the power-transmitting device S, the transmitting-side control unit 6 calculates the voltage and the current of the transmitting-side power converter 1 or the inverter circuit 2 by performing an operation process on the basis of the voltage and the current detected by the transmitting-side sensor 4, and causes the transmitting-side communication unit 5 to transmit the information on the voltage and the current. The transmitting-side control unit 6 may calculate the input power and cause the transmitting-side communication unit 5 to transmit the calculation result.

The transmitting-side control unit 6 instead of the receiving-side control unit 17 may perform the position determining process on the basis of the power efficiency. In this case, the receiving-side control unit 17 causes the receiving-side communication unit 16 to transmit information on the voltage and the current of the load circuit 13. The transmitting-side control unit 6 calculates the input power and the output power and calculates the power efficiency. The receiving-side control unit 17 may calculate the output power and cause the receiving-side communication unit 16 to transmit the calculation result.

Second, the receiving-side control unit 17 receives the voltage and the current of the transmitting-side power converter 1 or the inverter circuit 2 from the power-transmitting device S and calculates input power (power input to the transmitting-side power converter 1 or the inverter circuit 2). Then, the receiving-side control unit 17 performs the position determining process on the basis of the input power. For example, the receiving-side control unit 17 determines that the power-transmitting device S and the power-receiving device R have a positional relationship in which power is suppliable to the battery B when the input power is within a threshold range or equal to or greater than a threshold value.

The transmitting-side control unit 6 instead of the receiving-side control unit 17 may perform the position determining process on the basis of the input power. In this case, the transmitting-side control unit 6 calculates the input power on the basis of the voltage and the current of the transmitting-side power converter 1 or the inverter circuit 2.

Third, the receiving-side control unit 17 calculates the output power (power supplied to the load circuit 13) on the basis of the voltage and the current of the load circuit 13 and performs the position determining process on the basis of the output power. For example, the receiving-side control unit 17 determines that the power-transmitting device S and the power-receiving device R have a positional relationship in which power is suppliable to the battery B when the output power is within a threshold range or equal to or greater than a threshold value.

The transmitting-side control unit 6 instead of the receiving-side control unit 17 may perform the position determining process on the basis of the output power. In this case, the receiving-side control unit 17 causes the receiving-side communication unit 16 to transmit information on the voltage and the current of the load circuit 13. The transmitting-side control unit 6 calculates the output power from the received information on the voltage and the current. The receiving-side control unit 17 may calculate the output power and cause the receiving-side communication unit 16 to transmit the calculation result.

Fourth, the receiving-side control unit 17 performs the position determining process on the basis of the voltage of the load circuit 13. For example, the receiving-side control unit 17 determines that the power-transmitting device S and the power-receiving device R have a positional relationship in which power is suppliable to the battery B when the voltage is within a threshold range or equal to or greater than a threshold value.

The transmitting-side control unit 6 instead of the receiving-side control unit 17 may perform the position determining process on the basis of the voltage of the load circuit 13. In this case, the receiving-side control unit 17 causes the receiving-side communication unit 16 to transmit information on the voltage of the load circuit 13.

Fifth, the receiving-side control unit 17 performs the position determining process on the basis of the current of the load circuit 13. For example, the receiving-side control unit 17 determines that the power-transmitting device S and the power-receiving device R have a positional relationship in which power is suppliable to the battery B when the current is within a threshold range or equal to or greater than a threshold value.

The transmitting-side control unit 6 instead of the receiving-side control unit 17 may perform the position determining process on the basis of the current of the load circuit 13. In this case, the receiving-side control unit 17 causes the receiving-side communication unit 16 to transmit information on the current of the load circuit 13.

Sixth, the receiving-side control unit 17 calculates the input impedance (transmitting-side input impedance) when the power-receiving device R side is viewed from the input terminal of the inverter circuit 2 on the basis of the voltage and the current input to the inverter circuit 2 and performs the position determining process on the basis of the input impedance. For example, the receiving-side control unit 17 determines that the power-transmitting device S and the power-receiving device R have a positional relationship in which power is suppliable to the battery B when the input impedance is within a threshold range or equal to or greater than a threshold value.

In the power-transmitting device S, the transmitting-side control unit 6 calculates the input impedance of the inverter circuit 2 by performing an operation process on the basis of the voltage and the current detected by the transmitting-side sensor 4. The transmitting-side control unit 6 causes the transmitting-side communication unit 5 to transmit information on the input impedance. The transmitting-side control unit 6 may cause the transmitting-side communication unit 5 to transmit the voltage and the current detected by the transmitting-side sensor 4. In this case, the receiving-side control unit 17 calculates the input impedance. The transmitting-side control unit 6 instead of the receiving-side control unit 17 may perform the position determining process on the basis of the input impedance of the inverter circuit 2.

The upper limit of the input impedance of the inverter circuit 2 is determined, for example, on the basis of the withstanding voltage of an element in the wireless power-supplying system. The input impedance of the inverter circuit 2 is calculated using Equation (1). Here, Z denotes the input impedance, V denotes the input voltage of the inverter circuit 2, and P denotes the input power of the inverter circuit 2.

$$Z=V^2/P \tag{1}$$

A part of the input power is the output power which is output from the power-receiving device R to the battery B, and a difference between the input power and the output power is a power loss. For example, the power loss is a thermal loss from the inverter circuit 2 to immediately before the battery B. Since the desired power to be supplied to the battery B is determined depending on characteristics of the battery B, the output power is known. The power loss is also determined depending on a circuit configuration of the wireless power-supplying system or a degree of misalignment between the pads and is acquired by measurement. Accordingly, the desired input power of the inverter circuit 2 is determined in advance.

As can be seen from Equation (1), the larger the input impedance becomes, the higher the input voltage of the inverter circuit 2 needs to become in order to supply the desired power to the battery B. For example, as can be seen from FIG. 2, the input voltage of the inverter circuit 2 is a voltage across a capacitor 4a disposed at an output terminal of the chopper circuit 1b. The voltage applied to the capacitor 4a has a limit value of a voltage (withstanding voltage) Vmax with which the capacitor 4a is not destroyed. The withstanding voltage is specific to the capacitor and is known. That is, the input voltage of the inverter circuit 2 cannot be increased without any limit. Accordingly, the upper limit Zmax of the input impedance not causing destruction of the capacitor 4a is calculated using Equation (2). The value of Zmax is the upper limit of the input impedance.

$$Zmax=Vmax^2/P \tag{2}$$

The receiving-side control unit 17 calculates the input impedance on the basis of the input voltage and the input current of the inverter circuit 2. When the calculated input impedance is greater than the upper limit of the input impedance, the desired power cannot be supplied to the battery B without destroying the capacitor. Accordingly, the receiving-side control unit 17 determines that the power-transmitting device S and the power-receiving device R have a positional relationship in which power is not suppliable to the battery B.

The element which is problematic in view of the withstanding voltage is not limited to the capacitor of the chopper circuit 1b, but may be an arbitrary element in the wireless power-supplying system. For example, voltages applied to the switching elements 2a to 2d of the inverter circuit 2 or the switching element 4b of the chopper circuit 1b are as follows. In the inverter circuit 2, a combination of the switching elements 2a and 2d and a combination of the switching elements 2b and 2c are alternately turned on and off. Accordingly, when the combination of the switching elements 2a and 2d are turned on (that is, electrically connected), the voltage applied to the switching elements 2b and 2c is a value obtained by subtracting voltage drops of the switching elements 2a and 2d from the input voltage of the inverter circuit 2. When the combination of the switching elements 2b and 2c is turned on, the voltage across the switching elements 2a and 2d can be similarly calculated from the input voltage of the inverter circuit 2. A voltage obtained by adding a voltage drop of the diode 4c to the input voltage of the inverter circuit 2 is applied to the switching element 4b of the chopper circuit 1b. When the values of the voltage drops of the switching elements 2a to 2d and the diode 4c are sufficiently smaller than the input voltage of the inverter circuit 2, the values of the voltage drops may be ignored and the input voltage of the inverter circuit 2 may be considered to be applied to the switching elements 2a to 2d and the switching element 4b. Accordingly, Vmax can be calculated inversely from the withstanding voltages of the switching elements 2a to 2d or the diode 4c. Since each element has a withstanding voltage, the minimum value of Vmax which is determined for each element is employed to calculate the upper limit of the input impedance.

On the other hand, the lower limit of the input impedance of the inverter circuit 2 is determined, for example, on the basis of a heatproof temperature of an element in the wireless power-supplying system. The input impedance of the inverter circuit 2 is calculated using Equation (3). Here, Z denotes the input impedance, I denotes the input current of the inverter circuit 2, and P denotes the input power of the inverter circuit 2.

$$Z=P/I^2 \tag{3}$$

As can be seen from Equation (3), the smaller the input impedance becomes, the larger the input current of the inverter circuit 2 needs to become in order to supply the desired power to the battery B. The larger the input current of the inverter circuit 2 becomes, the larger the thermal loss in an internal resistor of each element in the wireless power-supplying system becomes. The larger the thermal loss becomes, the more easily the element may be destroyed. Accordingly, each element has a limit value of a temperature (heatproof temperature) at which the element is not destroyed. By measuring a relationship between the input current of the inverter circuit 2 and the temperature rise in each element in advance, the input current corresponding to the heatproof temperature is calculated from each element and the minimum value of the calculated input currents is set as Imax. Accordingly, the lower limit Zmin of the input impedance not causing destruction of each element due to heat is calculated using Equation (4). The value of Zmin is used as the lower limit of the input impedance.

$$Zmin=P/Imax^2 \tag{4}$$

The receiving-side control unit 17 calculates the input impedance on the basis of the input voltage and the input current of the inverter circuit 2. When the calculated input impedance is less than the lower limit of the input impedance, the desired power cannot be supplied to the battery B without destroying the element. Accordingly, the receiving-side control unit 17 determines that the power-transmitting device S and the power-receiving device R has a positional relationship in which power is not suppliable to the battery B.

In the above-mentioned method, the input impedance of the inverter circuit 2 is used to determine whether power is suppliable, but the present disclosure may employ impedance at another position of the wireless power-supplying system such as the output impedance (impedance when the power-receiving device side is viewed from the output terminal of the inverter circuit 2) of the inverter circuit 2. Here, the input impedance of the inverter circuit 2 can be calculated on the basis of a DC signal (a current and a voltage), and a signal can be detected more accurately than when an AC signal is used. When the transmitting-side sensor 4 is disposed at the input terminal of the inverter circuit 2, it is possible to realize the transmitting-side sensor 4 at a lower cost than a sensor detecting a high-frequency signal.

Seventh, the receiving-side control unit 17 performs the position determining process on the basis of a phase difference between the voltage and the current output from the inverter circuit 2. For example, the receiving-side control unit 17 determines that the power-transmitting device S and the power-receiving device R have a positional relationship in which power is suppliable to the battery B when the phase difference between the voltage and the current is within a threshold range or equal to or greater than a threshold value.

In the power-transmitting device S, the transmitting-side control unit 6 calculates the phase difference between the voltage and the current output from the inverter circuit 2 by performing an operation process on the basis of the voltage and the current detected by the transmitting-side sensor 4. Then, the transmitting-side control unit 6 causes the transmitting-side communication unit 5 to transmit information on the phase difference. The transmitting-side control unit 6 may cause the transmitting-side communication unit 5 to transmit the voltage and the current detected by the transmitting-side sensor 4. In this case, the receiving-side control unit 17 calculates the phase difference. The transmitting-side control unit 6 instead of the receiving-side control unit 17 may perform the position determining process on the basis of the phase difference between the voltage and the current output from the inverter circuit 2.

The receiving-side control unit 17 repeatedly performs the position determining process every predetermined time interval, sequentially generates a driving support image indicating the relative position between the power-transmitting coil 3a and the power-receiving coil 11a, and outputs the generated image to a display unit which is not shown. As a result, the relative position which sequentially varies subsequently to an initial value is sequentially displayed in time series on a top view centered on the moving body.

A driver of the moving body stops the vehicle so that the power-transmitting device S and the power-receiving device R have a positional relationship in which power is suppliable to the battery B by driving and operating the moving body with reference to the driving support image. The receiving-side control unit 17 changes the operation mode from the inspection mode to the power-supplying mode, notifies the power-transmitting device S that the power-transmitting device S and the power-receiving device R have a positional relationship in which power is suppliable to the battery B and the moving body stops via the receiving-side communication unit 16, switches the switch 14 to the closed state (ON state), and switches the load circuit 13 from the connected state (the ON state of the switching element 13b) to the disconnected state (the OFF state of the switching element 13b) (step S2 in FIG. 3).

On the other hand, when it is notified that the power-transmitting device S and the power-receiving device R have a positional relationship in which power is suppliable to the battery B and the moving body stops via the transmitting-side communication unit 5, the transmitting-side control unit 6 controls the chopper circuit 1b and the inverter circuit 2 so as to be a voltage (for example, 330 V) with which power is suppliable to the battery B.

According to this embodiment, the power-supplying mode for supplying power to the battery B and the inspection mode which is performed before transition to the power-supplying mode are provided. In the inspection mode, the switch 14 is switched to the open state, the load circuit 13 is switched from the disconnected state to the connected state, power is supplied from the power-transmitting device S to the power-receiving device R with a voltage lower than that in the power-supplying mode, and the position determining process of determining whether the power-transmitting device S and the power-receiving device R have a positional relationship in which power is suppliable to the battery B is performed on the basis of power, voltage, or current in at least one of the power-transmitting device S and the power-receiving device R. Accordingly, it is possible to specify a misalignment between the power-transmitting device S and the power-receiving device R without using a camera.

In the inspection mode, when power is supplied to the battery B instead of the load circuit 13, it is difficult to specify the misalignment even using the position determining process. The battery B has a voltage across the battery B depending on the state of charge. Accordingly, the impedance of the battery B varies depending on the power supplied from the power-transmitting device S, that is, depending on the current supplied to the battery B. As a result, even when the position determining process is applied to the battery B, it is not possible to determine which of the misalignment and the variation in impedance of the battery B the variation of the voltage, the current, or the power of the battery B is attributed to. On the other hand, the impedance of the load circuit 13 is constant and thus the voltage, the current, or the power of the load circuit 13 reflects the influence of the misalignment. Accordingly, it is possible to satisfactorily specify the misalignment by supplying power to the load circuit 13 using the switch 14 in the inspection mode.

According to this embodiment, when power is supplied to the load circuit 13, the receiving-side control unit 17 can control the power-transmitting device S so as to output a lower voltage to the power-receiving device R than that when power is supplied to the battery B (load). That is, in this embodiment, in the inspection mode, the receiving-side control unit 17 supplies power from the power-transmitting device S to the power-receiving device R with a voltage lower than that in the power-supplying mode. In the inspection mode, since it is intended to specify the misalignment and it is not necessary to charge the battery B, the output voltage of the power-transmitting device S is suppressed to be low. Accordingly, since the withstanding voltage of the load circuit 13 can be lowered, it is possible to achieve a decrease in size of the load circuit 13. The lower the voltage becomes, the less the output power from the power-transmitting device S becomes and thus energy consumption is suppressed.

While an embodiment of the present disclosure has been described above, the present disclosure is not limited to the above-mentioned embodiment and, for example, following variant examples can be considered.

(1) In the above-mentioned embodiment, the chopper circuit 1b is used as a voltage converter, but a transformer which is an insulated voltage converter may be used instead of the chopper circuit 1b which is a non-insulated voltage converter. In the above-mentioned embodiment, a full bridge is used as the transmitting-side rectifier circuit 1a or the receiving-side rectifier circuit 12a, but a half bridge may be used instead of the full bridge. A device (direct AC-DC conversion) into which a rectifier function and a voltage converter function are incorporated may be used. In the above-mentioned embodiment, the receiving-side power converter 12 includes the receiving-side rectifier circuit 12a and the filter circuit 12b, but a subsequent stage of the filter circuit 12b may be provided with a voltage converter depending on a load.

The battery B is provided as a load, but a DC load (an electric storage device such as a capacitor or a resistive load such as a heat-emitting body) or an AC load (an inductance load such as a motor) other than the battery B may be provided. When an AC load is provided, a configuration in which AC power is output from the receiving-side power converter 12 needs to be employed. The commercial power source which is an AC power source is used, but a DC power source may be used. When a DC power source is provided, the transmitting-side rectifier circuit 1a needs to be removed from the receiving-side power converter 12.

Figure 5A:
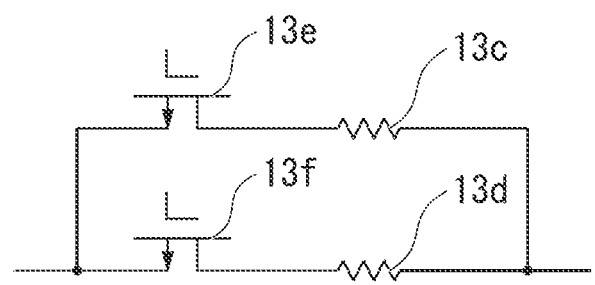
FIG. 5A is a diagram showing a variant example of the wireless power-supplying system according to the first embodiment of the present disclosure.
Figure 5B:
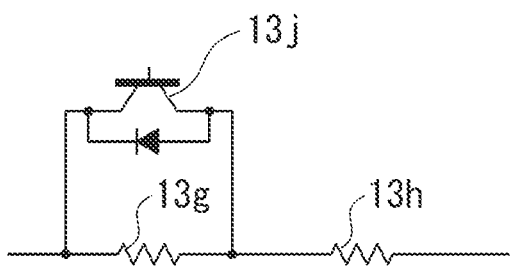
FIG. 5B is a diagram showing a variant example of the wireless power-supplying system according to the first embodiment of the present disclosure.

(2) In the above-mentioned embodiment, a configuration in which the load circuit 13 includes resistors 13c, 13d, 13g, and 13h or switching elements 13e, 13f, and 13j which are shown in FIG. 5A or 5B and a resistance value is changed by switching the switching elements 13e, 13f, and 13j to switch the resistors 13c, 13d, 13g, and 13h may be used.

(3) In the above-mentioned embodiment, the transmitting-side sensor 4 is disposed at the input terminal of the transmitting-side power converter 1 and the receiving-side sensor 15 is disposed at the output terminal of the receiving-side power converter 12, but the present disclosure is not limited to this aspect. The positions of the transmitting-side sensor 4 and the receiving-side sensor 15 can be determined depending on an object to be measured. For example, the transmitting-side sensor 4 may be disposed at the output terminal of the transmitting-side power converter 1 or the receiving-side sensor 15 may be disposed at the input terminal of the receiving-side power converter 12.

Hereinafter, a second embodiment of the present disclosure will be described with reference to the accompanying drawings.

Figure 6:
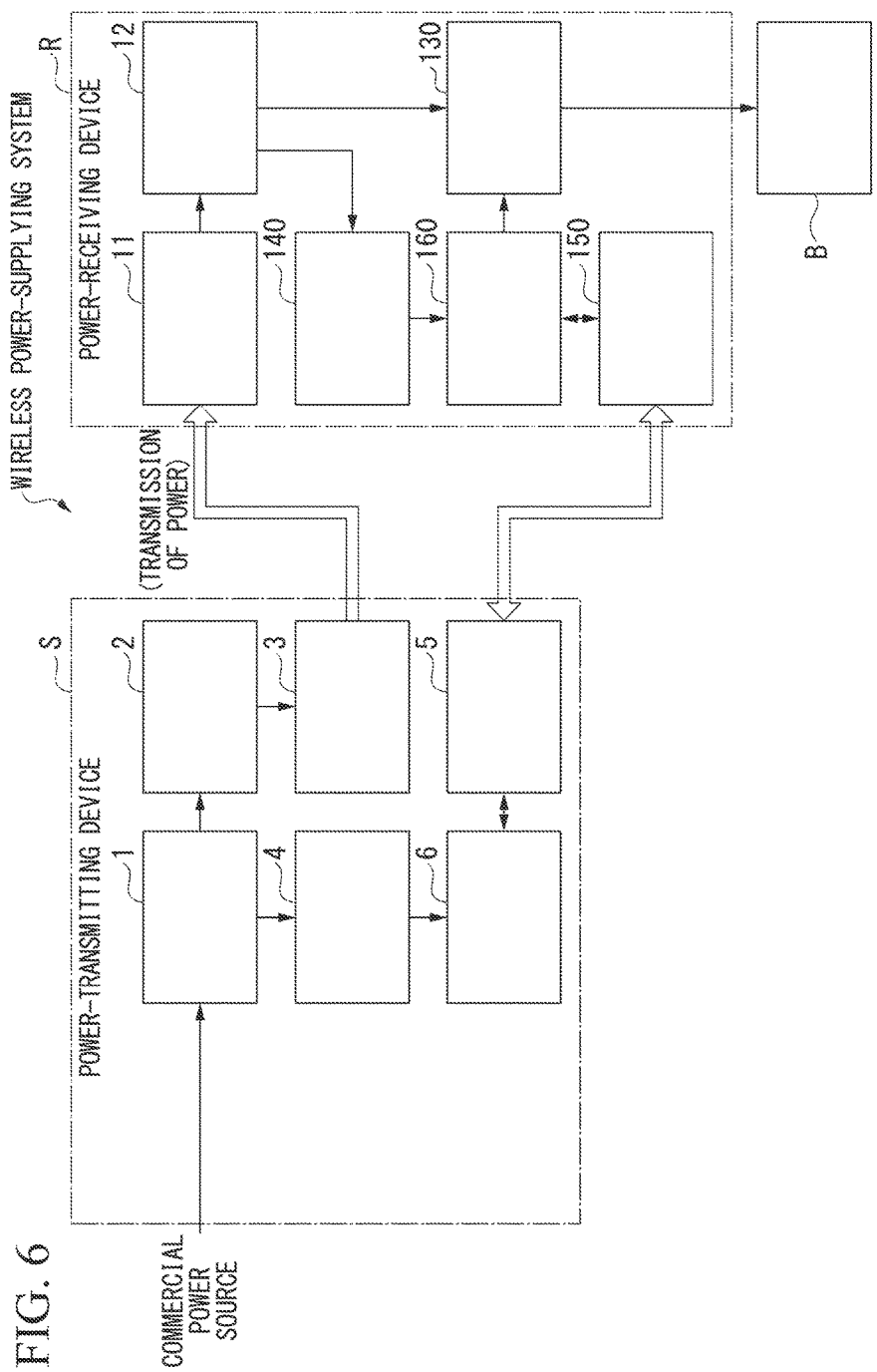
FIG. 6 is a functional block diagram of a wireless power-supplying system according to a second embodiment of the present disclosure.
Figure 7:
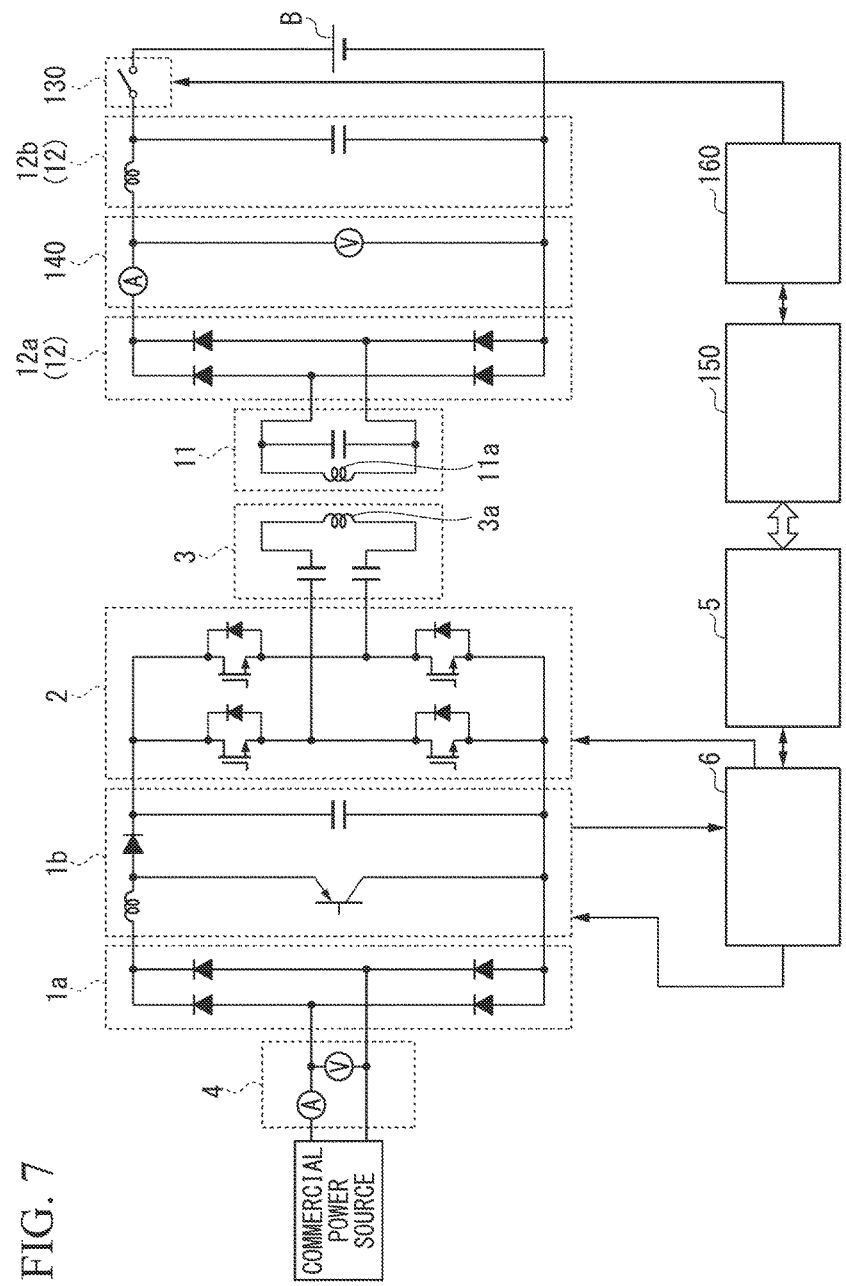
FIG. 7 is a circuit diagram of the wireless power-supplying system according to the second embodiment of the present disclosure.

A wireless power-supplying system according to this embodiment includes a power-transmitting device S and a power-receiving device R as shown in FIGS. 6 and 7. As shown in the drawings, the power-transmitting device S includes a transmitting-side power converter 1, an inverter circuit 2, a transmitting-side pad 3, a transmitting-side sensor 4, a transmitting-side communication unit 5, and a transmitting-side control unit 6.

On the other hand, the power-receiving device R includes a receiving-side pad 11, a receiving-side power converter 12, a switch 130, a receiving-side sensor 140, a receiving-side communication unit 150, and a receiving-side control unit 160.

The power-transmitting device S is a device that is fixed to a power-supplying facility installed on the ground and supplies AC power to a power-receiving device R disposed in a moving body in a wireless manner. The power-supplying facility is a facility which is provided with one or more stop spaces for a moving body and which includes the power-transmitting devices S corresponding to the number of stop spaces. On the other hand, the power-receiving device R is a device which is mounted on a moving body and which charges a battery B (load device) by converting AC power supplied from the power-transmitting device S into DC power. The moving body is, for example, a vehicle which requires reception of power from the outside, such as an electric vehicle or a hybrid vehicle.

In the power-transmitting device S, the transmitting-side power converter 1 includes a transmitting-side rectifier circuit 1a and a chopper circuit 1b.

The transmitting-side rectifier circuit 1a is, for example, a diode bridge and serves to full-wave rectify commercial power (for example, single-phase 100 V, 50 Hz) supplied from an external commercial power source and to output the rectified power to the chopper circuit 1b. The power (full-wave rectified power) supplied from the transmitting-side rectifier circuit 1a to the chopper circuit 1b is a unipolar (for example, positive polarity) pulsating flow in which sinusoidal commercial power is folded back at a zero-crossing point.

The chopper circuit 1b adjusts its output voltage and outputs the adjusted output voltage to the inverter circuit 2 by allowing the transmitting-side control unit 6 to control its switching operation. Specifically, the chopper circuit 1b is a step-up chopper circuit or a step-up/down chopper circuit and serves to step up/down a voltage input from the transmitting-side rectifier circuit 1a and to output the stepped-up/down voltage. The output of the chopper circuit 1b is DC power in which the full-wave rectified power as a pulsating flow is sufficiently smoothed by the function of a capacitor disposed at an output terminal of the chopper circuit 1b.

The chopper circuit 1b also serves as a power factor correction (PFC) circuit by allowing the transmitting-side control unit 6 to control its switching operation. That is, the chopper circuit 1b extends a current-flowing period of a current of the full-wave rectified power to correct a power factor by switching the full-wave rectified power at a frequency sufficiently higher than the frequency of the full-wave rectified power with respect to the zero-crossing point of the full-wave rectified power. Since it is generally known that the chopper circuit 1b serves as the power factor correction circuit, details of the principle of power factor correction of the chopper circuit 1b will not be described herein.

The inverter circuit 2 is a power converter circuit that converts DC power supplied from the transmitting-side rectifier circuit 1a into AC power of a predetermined frequency (driving frequency) on the basis of a switching signal (inverter driving signal) input from the transmitting-side control unit 6. That is, the inverter circuit 2 converts DC power into AC power through switching using the driving frequency by driving a plurality of switching elements in response to the inverter driving signal. The inverter circuit 2 outputs the AC power to the transmitting-side pad 3.

The transmitting-side pad 3 is, for example, a resonance circuit including a power-transmitting coil 3a and a power-transmitting capacitor, and generates a magnetic field on the basis of the AC power supplied from the inverter circuit 2. Among the power-transmitting coil 3a and the power-transmitting capacitor, the power-transmitting coil 3a is disposed at a position facing a predetermined position (position at which a power-receiving coil 11a is disposed) of a moving body which stops in the stop space.

The transmitting-side sensor 4 detects a current and a voltage of the power supplied from a commercial power source to the transmitting-side rectifier circuit 1a, and outputs a detection signal indicating the detected current and the detected voltage to the transmitting-side control unit 6. For example, a sensor that measures a magnetic field generated around a wire through which a current flows using the Hall effect or a sensor that measures a potential drop generated in a resistor which is inserted into a wire through which a current passes can be used as the current sensor. For example, a sensor that divides a voltage using a resistor and converts the voltage into a digital value using an analog-to-digital (AD) converter can be used as the voltage sensor.

The transmitting-side communication unit 5 performs short-range wireless communication with the receiving-side communication unit 150 of the power-receiving device R. The communication system between the transmitting-side communication unit 5 and the receiving-side communication unit 150 is a short-range wireless communication system such as ZigBee (registered trademark) or Bluetooth (registered trademark) or a short-range optical communication system using an optical signal. The transmitting-side communication unit 5 includes an antenna in a communication system using radio waves, and includes a light-emitting element and a light-receiving element for communication in a communication system using an optical signal.

The transmitting-side control unit 6 includes a central processing unit (CPU), a read only memory (ROM), a random access memory (RAM), and an interface circuit that transmits and receives various signals to and from units which are mutually electrically connected to each other. The transmitting-side control unit 6 controls the entire operations of the power-transmitting device S by performing various operation processes and communicating with the units on the basis of various operation control programs stored in the ROM. Details of the operation of the transmitting-side control unit 6 will be described later.

On the other hand, the receiving-side pad 11 in the power-receiving device R is, for example, a resonance circuit including a power-receiving coil 11a and a power-receiving capacitor and receives power via the magnetic field generated by the transmitting-side pad 3. The power-receiving coil 11a is disposed in the bottom, the side, the top, or the like of a moving body, and closely faces the power-transmitting coil 3a constituting the power-transmitting device S when the moving body stops in a stop space.

The power-receiving coil 11a of the receiving-side pad 11 closely faces the power-transmitting coil 3a constituting the transmitting-side pad 3 and is magnetically coupled thereto. That is, the receiving-side pad 11 receives AC power supplied to the power-transmitting coil 3a by the inverter circuit 2 and AC power based on the coupling coefficient between the power-transmitting coil 3a and the power-receiving coil 11a from the transmitting-side pad 3 in a wireless manner and outputs the received AC power to the receiving-side rectifier circuit 12a. That is, this embodiment is based on a magnetic-field resonance system, an electromagnetic induction system, or the like.

In the power-receiving device R, the receiving-side power converter 12 serves to convert power received via the receiving-side pad 11 from the transmitting-side pad 3 of the power-transmitting device S into power to be supplied to the battery B and includes a receiving-side rectifier circuit 12a and a filter circuit 12b.

The receiving-side rectifier circuit 12a is constituted, for example, by a diode bridge and serves to full-wave rectify AC power (received power) supplied from the receiving-side pad 11 and to output the rectified AC power to the filter circuit 12b. The power supplied from the receiving-side rectifier circuit 12a to the filter circuit 12b is full-wave rectified power which is full-wave rectified by the diode bridge.

The filter circuit 12b includes, for example, a reactor and a capacitor, removes noise from the full-wave rectified power supplied from the receiving-side control unit 17, and smooths and outputs the full-wave rectified power to the battery B.

The switch 130 is disposed between the filter circuit 12b and the battery B, is switched to an ON state and an OFF state under the control of the receiving-side control unit 17, and is embodied by an element having a circuit switching function, such as a switch, an electromagnetic contactor, or a breaker. The switch 130 is disposed to, for example, protect the battery B from an overcurrent and an overvoltage.

The receiving-side sensor 140 detects a current and a voltage of the DC power supplied from the receiving-side rectifier circuit 12a to the filter circuit 12b, and outputs a detection signal indicating the detected current and the detected voltage to the receiving-side control unit 160. For example, a sensor that measures a magnetic field generated around a wire through which a current flows using the Hall effect or a sensor that measures a potential drop generated in a resistor which is inserted into a wire through which a current passes can be used as the current sensor. For example, a sensor that divides a voltage using a resistor and converts the voltage into a digital value using an analog-to-digital (AD) converter can be used as the voltage sensor.

The receiving-side communication unit 150 performs short-range wireless communication with the transmitting-side communication unit 5 of the power-transmitting device S. The communication system between the transmitting-side communication unit 5 and the receiving-side communication unit 150 is a short-range wireless communication system such as ZigBee (registered trademark) or Bluetooth (registered trademark) or a short-range optical communication system using an optical signal. The receiving-side communication unit 150 includes an antenna in a communication system using radio waves, and includes a light-emitting element and a light-receiving element for communication in a communication system using an optical signal.

The receiving-side control unit 160 includes a central processing unit (CPU), a read only memory (ROM), a random access memory (RAM), and an interface circuit that transmits and receives various signals to and from units which are mutually electrically connected to each other. The transmitting-side control unit 6 controls the entire operations of the power-receiving device R by performing various operation processes and communicating with the units on the basis of various operation control programs stored in the ROM. Details of the operation of the receiving-side control unit 160 will be described later.

The battery B is a secondary battery such as a lithium ion battery or a nickel hydrogen secondary battery and is charged with DC power supplied from the receiving-side rectifier circuit 12a to accumulate the DC power. The battery B is connected to an inverter (running inverter) that drives a running motor of a moving body or/and a control device that controls running of the moving body and supplies driving power to the running inverter or the control device.

The operation of the wireless power-supplying system having the above-mentioned configuration will be described below in detail.

In the wireless power-supplying system, the receiving-side control unit 160 of the power-receiving device R of a moving body switches the switch 130 to the OFF states at the time of non-supply of power (for example, when a drive normally drives the moving body). On the other hand, the transmitting-side control unit 6 of the power-transmitting device S stops the chopper circuit 1b and the inverter circuit 2 at the time of non-supply of power, that is, when the moving body to be supplied with power does not stop at a parking or stop position. The transmitting-side control unit 6 causes the transmitting-side communication unit 5 to transmit a power-transmitting device notification signal. The power-transmitting device notification signal is a signal for notifying a surrounding power-receiving device R of presence of the power-transmitting device S.

The driver drives the moving body to move the moving body to a position at which the power-transmitting device S is disposed. As a result, the power-transmitting device notification signal from the power-transmitting device S is input to the receiving-side control unit 160 via the receiving-side communication unit 150. When the power-transmitting device notification signal is input, the receiving-side control unit 160 causes the wireless power-supplying system to operate in an inspection mode. The inspection mode is an operating mode for determining whether the power-receiving device R is located at a position at which power can be supplied from the power-transmitting device S before starting the supply of power to the battery B. After it is determined that power is suppliable in the inspection mode, the mode for supplying power to the battery B is switched to the power-supplying mode.

When the wireless power-supplying system is in the inspection mode, the receiving-side control unit 160 first switches the switch 130 to an open state (an OFF state) to open the connection between the filter circuit 12b of the receiving-side power converter 12 and the battery B. The receiving-side control unit 160 controls the receiving-side communication unit 150 so as to transmit an instruction signal instructing the power-transmitting device S to transmit power. In the inspection mode (when the switch 130 is opened), the receiving-side control unit 160 can instruct the power-transmitting device S to transmit power with a voltage (for example, 100 V) lower than that in the power-supplying mode (when the switch 130 is closed). The power-receiving device R may not transmit the instruction signal but may transmit a notification signal indicating that the switch 130 is switched to the open state or a response signal indicating that the power-transmitting device notification signal has received to the power-transmitting device S. The power-transmitting device S can voluntarily start transmission of power by receiving the notification signal. When the response signal is received, the power-transmitting device S can voluntarily start transmission of power after a predetermined time elapses in consideration of a time required until the power-receiving device R switches the switch 130 to the open state (OFF state).

The transmitting-side control unit 6 receives the instruction signal or the like via the transmitting-side communication unit 5 and drives the chopper circuit 1b and the inverter circuit 2. Since the switch 130 is in the open state, a current does not flow in the battery B, but a voltage is generated at the output terminal of the receiving-side rectifier circuit 12a. The receiving-side control unit 160 acquires the value of the voltage via the receiving-side sensor 140.

When the power-transmitting device S transmits the same power, the voltage (hereinafter, referred to as inspection voltage) generated in the power-receiving device R becomes higher as the degree of misalignment between the power-transmitting device S and the power-receiving device R becomes smaller. The misalignment means a shift from a positional relationship between the power-transmitting device S (the power-transmitting coil 3a) and the power-receiving device R (the power-receiving coil 11a) in which power efficiency is maximized. The power efficiency refers to a ratio of power at a position in the power-receiving device R to power at a position in the power-transmitting device S and, for example, the ratio of power supplied to the battery B to power supplied from the commercial power source to the power-transmitting device S can be used as the power efficiency. The ratio of power supplied to the battery B to power input to the inverter circuit 2 of the power-transmitting device S can also be used as the power efficiency. In this case, in order to calculate the power input to the inverter circuit 2, the input terminal of the inverter circuit 2 may be provided with a sensor or a value of the input terminal of the inverter circuit 2 may be estimated from the detected value of the transmitting-side sensor 4.

In order to enable supply of power from the power-transmitting device S to the power-receiving device R, the power efficiency needs to be equal to or greater than a desired minimum value for the purpose of efficient supply of power. A misalignment in which the power efficiency is the desired minimum value is present and a value of an inspection voltage (power-suppliable threshold value) corresponding to the misalignment is present. The smaller the misalignment becomes, the higher the inspection voltage becomes. Accordingly, when the inspection voltage is equal to or higher than the power-suppliable threshold value, the power-transmitting device S can supply power to the power-receiving device R. When the output voltage of the receiving-side rectifier circuit 12a is a pulsating voltage, the receiving-side control unit 160 can compare, for example, a maximum value or an average value of the output voltage of the receiving-side rectifier circuit 12a with the power-suppliable threshold value.

Therefore, the receiving-side control unit 160 determines whether the output voltage (inspection voltage) of the receiving-side rectifier circuit 12a is equal to or higher than the power-suppliable threshold value. In the inspection mode, the receiving-side control unit 160 repeatedly compares the inspection voltage based on the transmission of power from the power-transmitting device S with the power-suppliable threshold value at predetermined time intervals, determines whether the power-transmitting device S and the power-receiving device R have a positional relationship in which power is suppliable, and displays the result on a display device (not shown).

A driver of a moving object stops the vehicle so that the power-transmitting device S and the power-receiving device R have a positional relationship in which power is suppliable to the battery B by driving and operating the moving body with reference to details displayed on the display device. When it is determined that the power-transmitting device S and the power-receiving device R have a positional relationship in which power is suppliable to the battery B, the receiving-side control unit 160 causes the wireless power-supplying system to operate in the inspection mode.

Specifically, the receiving-side control unit 160 notifies the power-transmitting device S that the power-transmitting device S and the power-receiving device R have a positional relationship in which power is suppliable to the battery B and the moving body stops via the receiving-side communication unit 150. The receiving-side control unit 160 switches the switch 130 to the closed state (the ON state).

Figure 8:
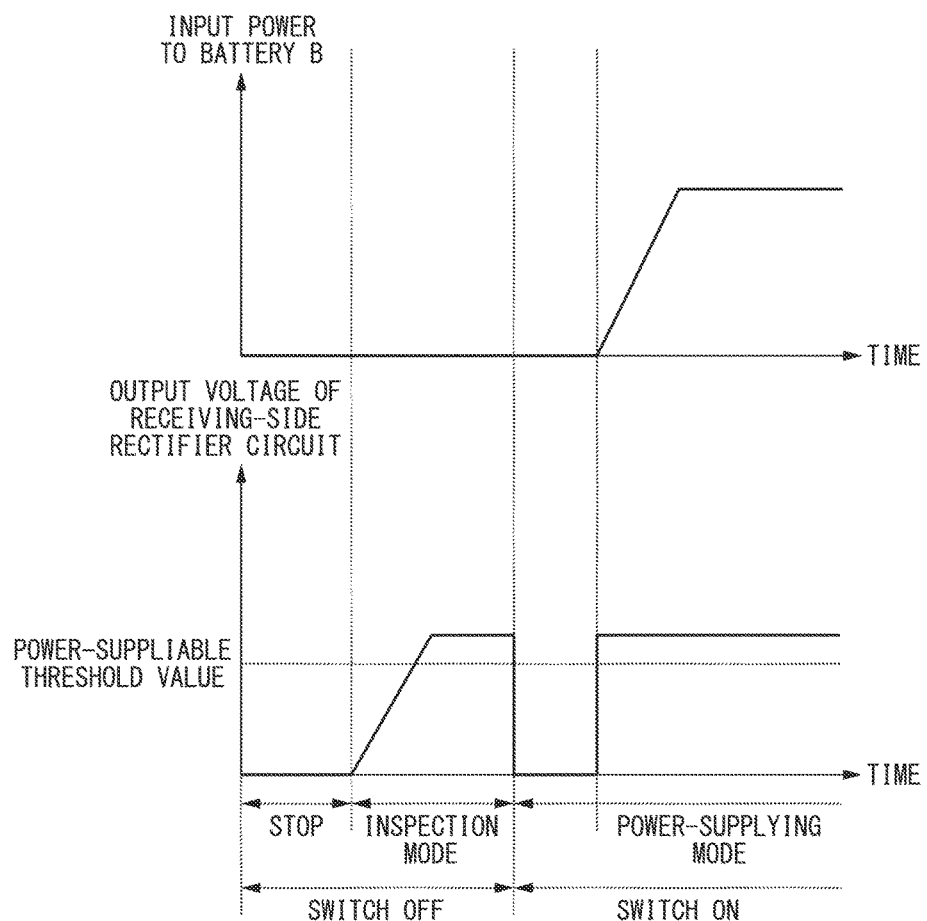
FIG. 8 is a diagram showing an output voltage of a receiving-side rectifier circuit and an input voltage of a battery in the wireless power-supply system according to the second embodiment of the present disclosure.

On the other hand, the transmitting-side control unit 6 of the power-transmitting device S controls the chopper circuit 1b and the inverter circuit 2 so as to be a voltage (for example, 330 V) with which power is suppliable to the battery B. At this time, the output voltage of the receiving-side rectifier circuit 12a varies as shown in FIG. 8.

According to this embodiment, the receiving-side control unit 160 opens the switch 130 so as to open the connection between the filter circuit 12b of the receiving-side power converter 12 and the battery B and determines whether the voltage of the receiving-side rectifier circuit 12a based on the transmission of power from the power-transmitting device S is equal to or higher than the power-suppliable threshold value.

Accordingly, it is possible to determine whether the power-transmitting device S and the power-receiving device R have a power-suppliable positional relationship without using a camera. In the inspection mode, since the switch 130 is opened, unintentional power is not applied to the battery B during positioning of the power-transmitting device S and the power-receiving device R, and it is thus possible to prevent deterioration of the battery B.

In this embodiment, the receiving-side control unit 160 can control the power-transmitting device S so as to transmit power in the inspection mode with a voltage lower than that in the power-supplying mode. In the inspection mode, since it is not intended to charge the battery B, the power-transmitting device S does not need to transmit power with a voltage to be applied to the battery B. In general, the lower the voltage becomes, the smaller the influence of an element constituting a circuit becomes. Accordingly, it is possible to extend a life span of an element by lowering the voltage of the power from the power-transmitting device S in the inspection mode.

While an embodiment of the present disclosure has been described above, the present disclosure is not limited to the embodiment and, for example, the following variant examples can be considered.

(1) In the above-mentioned embodiment, the chopper circuit 1b is used as a voltage converter, but a transformer which is an insulated voltage converter may be used instead of the chopper circuit 1b which is a non-insulated voltage converter. In the above-mentioned embodiment, a full bridge is used as the transmitting-side rectifier circuit 1a or the receiving-side rectifier circuit 12a, but a half bridge may be used instead of the full bridge. In the above-mentioned embodiment, the receiving-side power converter 12 includes the receiving-side rectifier circuit 12a and the filter circuit 12b, but a subsequent stage of the filter circuit 12b may be provided with a voltage converter depending on a load device.

The battery B is provided as a load device, but a DC load or an AC load other than the battery B may be provided. When an AC load is provided, a configuration in which AC power is output from the receiving-side power converter 12 needs to be employed. Alternatively, the receiving-side rectifier circuit may be removed and the AC power of a driving frequency may be connected directly to the load. The commercial power source which is an AC power source is used, but a DC power source may be used. When a DC power source is provided, the transmitting-side rectifier circuit 1a needs to be removed from the receiving-side power converter 12.

(2) In the above-mentioned embodiment, it is determined whether the power-transmitting device S and the power-receiving device R have a positional relationship in which power is suppliable on the basis of the output voltage of the receiving-side rectifier circuit 12a, but the present disclosure is not limited to this configuration. For example, it may be determined whether the power-transmitting device S and the power-receiving device R have a positional relationship in which power is suppliable on the basis of the output voltage of the filter circuit 12b. The receiving-side control unit 160 may determine whether the power-transmitting device S and the power-receiving device R have a positional relationship in which power is suppliable on the basis of the output voltage of the receiving-side pad 11. Since the output voltage of the receiving-side pad 11 is an AC voltage, the receiving-side control unit 160 can compare the output voltage with a threshold value by calculating a peak value, an effective value, or the like.

Hereinafter, a third embodiment of the present disclosure will be described with reference to the accompanying drawings.

Figure 9:
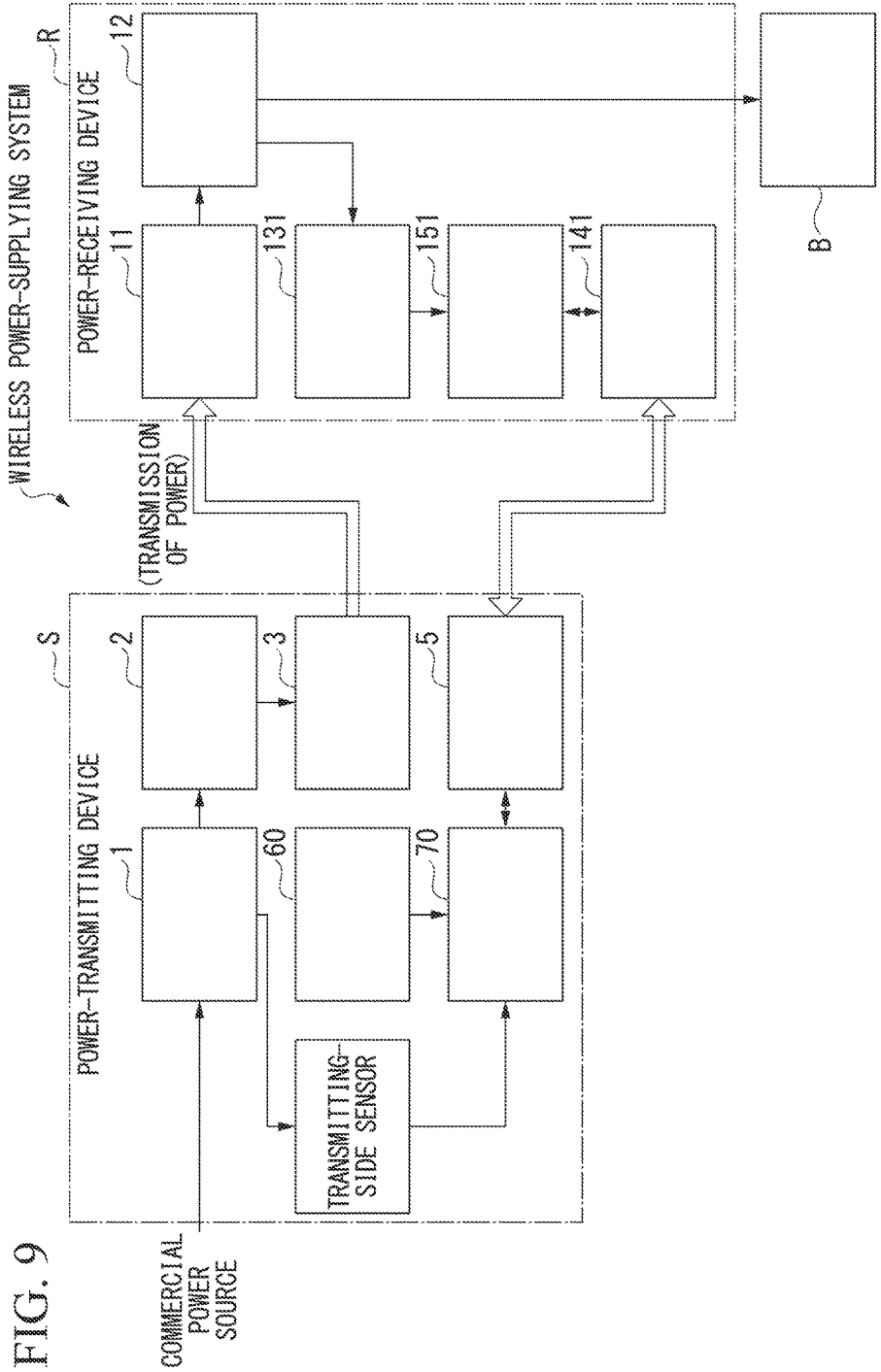
FIG. 9 is a functional block diagram of a wireless power-supplying system including a power-transmitting device according to a third embodiment of the present disclosure.
Figure 10:
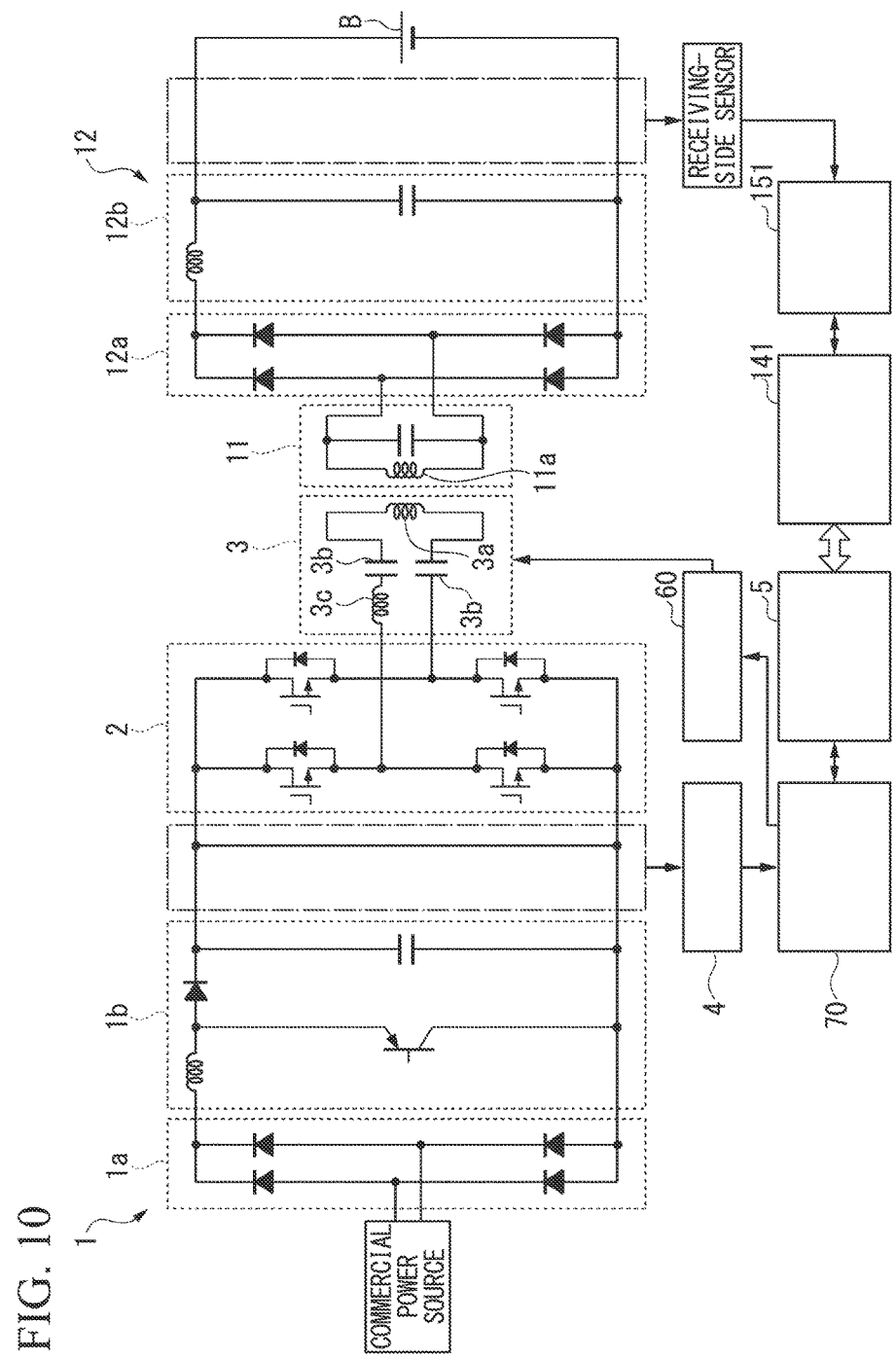
FIG. 10 is a circuit diagram of the wireless power-supplying system including the power-transmitting device according to the third embodiment of the present disclosure.

A power-transmitting device S according to this embodiment is a constituent of a wireless power-supplying system. That is, a wireless power-supplying system according to this embodiment includes a power-transmitting device S and a power-receiving device R as shown in FIGS. 9 and 10. As shown in the drawings, the power-transmitting device S includes a transmitting-side power converter 1, an inverter circuit 2, a transmitting-side pad 3, a transmitting-side sensor 4, a transmitting-side communication unit 5, a drive unit 60, and a transmitting-side control unit 70 (control unit).

On the other hand, the power-receiving device R includes a receiving-side pad 11, a receiving-side power converter 12, a receiving-side sensor 131, a receiving-side communication unit 141, and a receiving-side control unit 151.

The power-transmitting device S is a device that is fixed to a power-supplying facility installed on the ground and supplies AC power to a power-receiving device R disposed in a moving body in a wireless manner. The power-supplying facility is a facility which is provided with one or more stop spaces for a moving body and which includes the power-transmitting devices S corresponding to the number of stop spaces. On the other hand, the power-receiving device R is a device which is mounted on a moving body and which charges a battery B by converting AC power supplied from the power-transmitting device S into DC power. The moving body is, for example, a vehicle which requires reception of power from the outside, such as an electric vehicle or a hybrid vehicle.

In the power-transmitting device S, the transmitting-side power converter 1 includes a transmitting-side rectifier circuit 1a and a chopper circuit 1b.

The transmitting-side rectifier circuit 1a is, for example, a diode bridge and serves to full-wave rectify commercial power (for example, single-phase 100 V, 50 Hz) supplied from an external commercial power source and to output the rectified power to the chopper circuit 1b. The power (full-wave rectified power) supplied from the transmitting-side rectifier circuit 1a to the chopper circuit 1b is a unipolar (for example, positive polarity) pulsating flow in which sinusoidal commercial power is folded back at a zero-crossing point.

The chopper circuit 1b adjusts its output voltage and outputs the adjusted output voltage to the inverter circuit 2 by allowing the transmitting-side control unit 70 to control its switching operation. Specifically, the chopper circuit 1b is a step-up chopper circuit or a step-up/down chopper circuit and serves to step up/down a voltage input from the transmitting-side rectifier circuit 1a and to output the stepped-up/down voltage. The output of the chopper circuit 1b is DC power in which the full-wave rectified power as a pulsating flow is sufficiently smoothed by the function of a capacitor disposed at an output terminal of the chopper circuit 1b. The capacitor disposed at the output terminal of the chopper circuit 1b may be disposed at an input terminal of the inverter circuit 2 as a part of the inverter circuit 2 instead of a part of the chopper circuit.

The chopper circuit 1b also serves as a power factor correction (PFC) circuit by allowing the transmitting-side control unit 70 to control its switching operation. That is, the chopper circuit 1*b* extends a current-flowing period of a current of the full-wave rectified power to correct a power factor by switching the full-wave rectified power at a frequency sufficiently higher than the frequency of the full-wave rectified power with respect to the zero-crossing point of the full-wave rectified power. Since it is generally known that the chopper circuit 1*b* serves as the power factor correction circuit, details of the principle of power factor correction of the chopper circuit 1*b* will not be described herein.

The inverter circuit 2 is a power converter circuit that converts DC power supplied from the transmitting-side rectifier circuit 1*a* into AC power of a predetermined frequency (driving frequency) on the basis of a switching signal (inverter driving signal) input from the transmitting-side control unit 70. That is, the inverter circuit 2 converts DC power into AC power through switching using the driving frequency by driving a plurality of switching elements (such as IGBTs or power metal-oxide-semiconductor field-effect transistor (MOSFETs)) in response to the inverter driving signal. The inverter circuit 2 outputs the AC power to the transmitting-side pad 3.

The transmitting-side pad 3 is, for example, a resonance circuit including a power-transmitting coil 3*a*, a power-transmitting capacitor 3*b*, and a second coil 3*c* and generates a magnetic field on the basis of the AC power supplied from the inverter circuit 2. Among the power-transmitting coil 3*a*, the power-transmitting capacitor 3*b*, and the second coil 3*c*, the power-transmitting coil 3*a* is disposed at a position facing a predetermined position (position at which a power-receiving coil 11*a* is disposed) of a moving body which stops in the stop space. For example, the power-transmitting capacitor 3*b* is a variable capacitor. On the other hand, the second coil 3*c* is a variable reactor.

The transmitting-side sensor 4 detects a current and a voltage in the power-transmitting device S, and outputs a detection signal indicating the detected current and the detected voltage to the transmitting-side control unit 70. For example, a sensor that measures a magnetic field generated around a wire through which a current flows using the Hall effect or a sensor that measures a potential drop generated in a resistor which is inserted into a wire through which a current passes can be used as the current sensor. For example, a sensor that divides a voltage using a resistor and converts the voltage into a digital value using an analog-to-digital (AD) converter can be used as the voltage sensor. In the transmitting-side sensor 4, the current sensor is disposed to detect a current input to the inverter circuit 2. The voltage sensor is disposed to detect a voltage input to the inverter circuit 2.

The transmitting-side communication unit 5 performs short-range wireless communication with the receiving-side communication unit 141 of the power-receiving device R. The communication system between the transmitting-side communication unit 5 and the receiving-side communication unit 141 is a short-range wireless communication system such as ZigBee (registered trademark) or Bluetooth (registered trademark) or a short-range optical communication system using an optical signal. The transmitting-side communication unit 5 includes an antenna in a communication system using radio waves, and includes a light-emitting element and a light-receiving element for communication in a communication system using an optical signal.

The drive unit 60 is a drive device such as a motor that drives the power-transmitting capacitor 3*b* which is a variable capacitor or the second coil 3*c* which is a variable reactor for the purpose of adjustment of inductance or capacitance of the transmitting-side pad 3, and operates on the basis of a control command input from the transmitting-side control unit 70.

The transmitting-side control unit 70 includes a central processing unit (CPU), a read only memory (ROM), a random access memory (RAM), and an interface circuit that transmits and receives various signals to and from units which are mutually electrically connected to each other. The transmitting-side control unit 70 controls the entire operations of the power-transmitting device S by performing various operation processes and communicating with the units on the basis of various operation control programs stored in the ROM. Details of the operation of the transmitting-side control unit 70 will be described later.

On the other hand, the receiving-side pad 11 in the power-receiving device R is, for example, a resonance circuit including a power-receiving coil 11*a* and a power-receiving capacitor and receives power via the magnetic field generated by the transmitting-side pad 3. The power-receiving coil 11*a* is disposed in the bottom, the side, the top, or the like of a moving body, and closely faces the power-transmitting coil 3*a* constituting the power-transmitting device S when the moving body stops in a stop space.

The power-receiving coil 11*a* of the receiving-side pad 11 closely faces the power-transmitting coil 3*a* constituting the transmitting-side pad 3 and is magnetically coupled thereto. That is, the receiving-side pad 11 receives AC power supplied to the power-transmitting coil 3*a* by the inverter circuit 2 and AC power based on the coupling coefficient between the power-transmitting coil 3*a* and the power-receiving coil 11*a* in a wireless manner and outputs the received AC power to the receiving-side rectifier circuit 12*a*. That is, the wireless power-supplying system is a wireless power-supplying system based on an electromagnetic induction system. The above-mentioned embodiment describes the wireless power-supplying system based on an electromagnetic induction system, but the present disclosure can be applied to a magnetic-field resonance system.

In the power-receiving device R, the receiving-side power converter 12 includes a receiving-side rectifier circuit 12*a* and a filter circuit 12*b*.

The receiving-side rectifier circuit 12*a* is constituted, for example, by a diode bridge and serves to full-wave rectify AC power (received power) supplied from the receiving-side pad 11 and to output the rectified AC power to the filter circuit 12*b*. The power supplied from the receiving-side rectifier circuit 12*a* to the filter circuit 12 is full-wave rectified power which is full-wave rectified by the diode bridge.

The filter circuit 12*b* includes, for example, a reactor and a capacitor, removes noise from the full-wave rectified power supplied from the receiving-side rectifier circuit 12*a*, and smooths and outputs the full-wave rectified power to the battery B.

The receiving-side sensor 131 detects a current and a voltage of the DC power supplied from the filter circuit 12*b* to the battery B, and outputs a detection signal indicating the detected current and the detected voltage to the transmitting-side control unit 70. For example, a sensor that measures a magnetic field generated around a wire through which a current flows using the Hall effect or a sensor that measures a potential drop generated in a resistor which is inserted into a wire through which a current passes can be used as the current sensor. For example, a sensor that divides a voltage using a resistor and converts the voltage into a digital value using an analog-to-digital (AD) converter can be used as the voltage sensor.

The receiving-side communication unit 141 performs short-range wireless communication with the transmitting-side communication unit 5 of the power-transmitting device S. The communication system between the transmitting-side communication unit 5 and the receiving-side communication unit 141 is a short-range wireless communication system such as ZigBee (registered trademark) or Bluetooth (registered trademark) or a short-range optical communication system using an optical signal.

The receiving-side communication unit 141 includes an antenna in a communication system using radio waves, and includes a light-emitting element and a light-receiving element for communication in a communication system using an optical signal.

The receiving-side control unit 151 includes a central processing unit (CPU), a read only memory (ROM), a random access memory (RAM), and an interface circuit that transmits and receives various signals to and from units which are mutually electrically connected to each other. The receiving-side control unit 151 controls the entire operations of the power-receiving device R by performing various operation processes and communicating with the units on the basis of various operation control programs stored in the ROM.

The battery B is a secondary battery such as a lithium ion battery and is charged with DC power supplied from the receiving-side rectifier circuit 12*a* to accumulate the DC power. The battery B is connected to an inverter (running inverter) that drives a running motor of a moving body or/and a control device that controls running of the moving body and supplies driving power to the running inverter or the control device.

The operation of the wireless power-supplying system having the above-mentioned configuration will be described below in detail.

In the wireless power-supplying system, when a moving body enters a stop space in which the power-transmitting device S is installed, the power-transmitting device S starts supply of power to the power-receiving device R of the moving body. For example, the transmitting-side communication unit 5 of the power-transmitting device S continuously issues a communication request signal with a predetermined cycle, and the receiving-side communication unit 141 of the power-receiving device R can receive the communication request signal and thus transmits a response signal to the communication request signal to the transmitting-side communication unit 5 when the moving body enters the stop space. When the response signal is received, the transmitting-side communication unit 5 notifies the transmitting-side control unit 70 of the receiving of the response signal. As a result, the transmitting-side control unit 70 determines (recognizes) that the moving body enters a power-suppliable area. The transmitting-side control unit 70 controls the chopper circuit 1*b* and the inverter circuit 2 so as to start the supply of power to the power-receiving device R.

Subsequently, the transmitting-side control unit 70 determines whether a power efficiency linked value which is information indicated by the input power of the inverter circuit 2 and is linked with power efficiency in the transmission of power is within a range in which specified power efficiency is obtainable (step S1). Specifically, the transmitting-side control unit 70 determines whether the input impedance (power efficiency linked value) of the inverter circuit 2 is within a range in which specified power efficiency is obtainable. The range may be a range in which specified power efficiency is obtainable and a withstanding voltage of an element of at least one of the inverter circuit 2 and the transmitting-side pad 3 is not exceedable. The power efficiency refers to a ratio of power at a position in the power-receiving device R to power at a position in the power-transmitting device S. For example, the power efficiency is a ratio of power supplied to the battery B to input power of the inverter circuit 2 of the power-transmitting device S. Alternatively, the power efficiency is the ratio of power supplied to the battery B to power supplied from the power-transmitting device S from a commercial power source. In this case, the input terminal of the transmitting-side rectifier circuit 1*a* is provided with a sensor Here, the transmitting-side control unit 70 calculates the input impedance on the basis of the detection signal input from the transmitting-side sensor 4. That is, the transmitting-side control unit 70 calculates the input impedance of the inverter circuit 2 by dividing a voltage value input to the inverter circuit 2 by a current value input to the inverter circuit 2.

The input impedance is impedance when the power-receiving side is viewed from the input terminal of the inverter circuit 2. The coupling coefficient between the transmitting-side pad 3 and the receiving-side pad 11 is changed depending on the misregistration, and a state of charge (SOC) of the battery B or desired power to be supplied to the battery B is also changed depending on charging conditions. With this change, the input impedance of the chopper circuit 1*b* is changed. The input impedance is changed with a change in inductance or capacitance of the transmitting-side pad 3, that is, by causing the drive unit 60 to drive the power-transmitting capacitor 3*b* which is a variable capacitor or the second coil 3*c* which is a variable reactor.

Subsequently, when the input impedance of the inverter circuit 2 is not within the above-mentioned range (NO), the transmitting-side control unit 70 adjusts at least one of the inductance and the capacitance of the transmitting-side pad 3 so that the input impedance is within the range (step S2). That is, the transmitting-side control unit 70 controls the drive unit 60 so that the input impedance is within the range, and causes the drive unit 60 to drive at least one of the power-transmitting capacitor 3*b* which is a variable capacitor and the second coil 3*c* which is a variable reactor in the transmitting-side pad 3.

Figure 11:
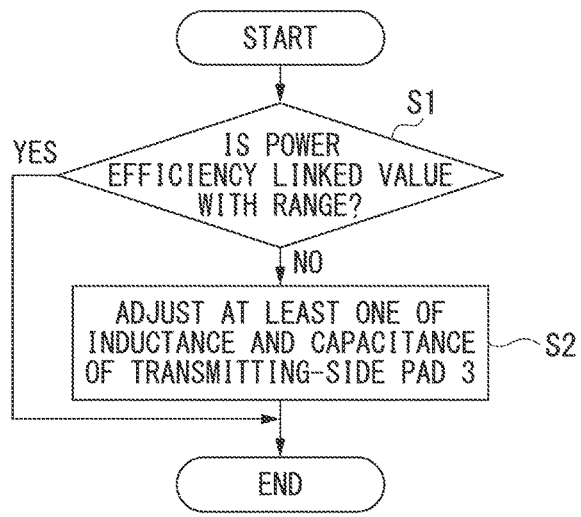
FIG. 11 is a flowchart showing an operation of the power-transmitting device according to the third embodiment of the present disclosure.
Figure 12:
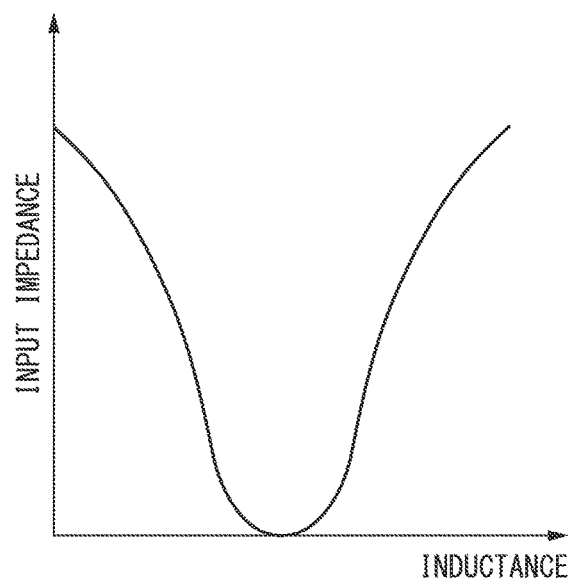
FIG. 12 is a graph showing a relationship between input impedance of an inverter circuit 2 and inductance of a second coil in the power-transmitting device according to the third embodiment of the present disclosure.

For example, the input impedance is changed in a V shape with the change of the inductance of the second coil 3*c* as shown in FIG. 11. An approximate impedance value based on the change of the inductance of the second coil 3*c* linked with the driving by the drive unit 60 is experimentally acquired beforehand. Then, a data table based on the data experimentally acquired, that is, a data table (see FIG. 12) in which an approximate impedance (impedance range) for each inductance of the second coil 3*c* (or the degree of driving of the second coil 3*c* by the drive unit 60) is registered, is prepared and is stored in the receiving-side control unit 70 in advance.

The transmitting-side control unit 70 controls the drive unit 60 on the basis of the data table so that the input impedance is within the range. When the power-transmitting capacitor 3*b* is driven, a data table based on the capacitance of the power-transmitting capacitor 3*b* is stored in the transmitting-side control unit 70 in advance. As a result, in this embodiment, the input impedance of the inverter circuit 2 is within the range and the specified power efficiency can be obtained.

In the background art, the power-transmitting device receives voltage information or current information in the power-receiving device from the power-receiving device by communication and controls the operation of the inverter circuit or the like on the basis of the voltage information or the current information or transmits an operation command for improving the power efficiency to the power-receiving device by communication. However, in the background art, since the voltage information, the current information, or the like needs to be transmitted and received to determine whether the specified power efficiency is realized, there is a problem in which the operations may be delayed due to a communication delay.

According to this embodiment, the transmitting-side control unit 70 determines whether the input impedance of the inverter circuit 2 is within the range in which specified power efficiency is obtainable. That is, the transmitting-side control unit 70 uses only information (the input impedance of the inverter circuit 2) in the power-transmitting device S to determine whether the specified power efficiency is realized and thus does not need to communicate with the power-receiving device R. When the input impedance of the inverter circuit 2 is not within the above-mentioned range, the transmitting-side control unit 70 adjusts at least one of inductance and capacitance of the transmitting-side pad 3 so that the input impedance is within the range. Accordingly, it is possible to improve the power efficiency in transmission of power without using communication. That is, in this embodiment, it is possible to determine whether specified power efficiency is realized without using communication at the time of supply of power.

While an embodiment of the present disclosure has been described above, the present disclosure is not limited to the embodiment and, for example, the following variant examples can be considered.

(1) In the above-mentioned embodiment, the transmitting-side control unit 70 adjusts at least one of inductance and capacitance of the transmitting-side pad 3 so that the input impedance is within the range when the input impedance which is a power efficiency linked value is not within the above-mentioned range, but the present disclosure is not limited to this configuration. For example, when the power efficiency linked value is not within the above-mentioned range, the transmitting-side control unit 70 may notify the outside that the power efficiency linked value is not within the range, for example, may notify a driver of a moving body having the power-receiving device R mounted thereon using a speaker or a display device. Accordingly, the driver can move the moving body having the power-receiving device R mounted thereon to an appropriate position by driving the moving body.

(2) In the above-mentioned embodiment, the transmitting-side control unit 70 determines whether the input impedance which is information indicated by the input power of the inverter circuit 2 and a power efficiency linked value linked with power efficiency in the transmission of power is within the range in which specified power efficiency is obtainable, but the present disclosure is not limited to this configuration.

For example, the transmitting-side control unit 70 may determine whether a power efficiency linked value which is information indicated by output power of the inverter circuit 2 and is linked with power efficiency in the transmission of power is within a range in which specified power efficiency is obtainable. That is, the power efficiency linked value may be the output impedance of the inverter circuit 2 or a phase difference between the output voltage and the output current of the inverter circuit 2. The output impedance is impedance when the power-receiving side is viewed from the output terminal of the inverter circuit 2.

Here, the current sensor of the transmitting-side sensor 4 is disposed to detect a current output from the inverter circuit 2. The voltage sensor is disposed to detect a voltage output from the inverter circuit 2.

The current sensor or the voltage sensor of the transmitting-side sensor 4 may be disposed, for example, at a position at which an output current or an output voltage of a commercial power source is detected. Here, the transmitting-side control unit 70 may estimate an input current and an input voltage or an output current and an output voltage of the inverter circuit 2 on the basis of the detection signal of the transmitting-side sensor 4.

(3) In the above-mentioned embodiment, the second coil 3c is a variable reactor, but a configuration which includes reactors c1, c2, c3, and c4 and switching elements SW1, SW, and SW3 shown in FIG. 14A or 14B and in which the inductance is changed by switching the switching elements SW1, SW2, and SW3 to switch the reactors c1, c2, c3, and c4 may be employed instead of the variable reactor. In this case, since the switching of the switching elements SW1, SW2, and SW3 is controlled in accordance with a control command input from the transmitting-side control unit 70, the drive unit 60 may be skipped. When the capacitance of the transmitting-side pad 3 is changed as described above, capacitors and switching elements may be configured like the configuration of the reactors c1, c2, c3, and c4 and the switching elements SW1, SW2, and SW3 shown in FIG. 13 and the capacitors may be switched.

(4) In the above-mentioned embodiment, the chopper circuit 1b is used as a voltage converter, but a transformer which is an insulated voltage converter may be used instead of the chopper circuit 1b which is a non-insulated voltage converter. In the above-mentioned embodiment, a full bridge is used as the transmitting-side rectifier circuit 1a or the receiving-side rectifier circuit 12a, but a half bridge may be used instead of the full bridge. In the above-mentioned embodiment, a subsequent stage of the filter circuit 12b may be provided with a voltage converter depending on a load.

The battery B is provided as a load, but a DC load (an electric storage device such as a capacitor or a resistive load such as a heat-emitting body) or an AC load (an inductance load such as a motor) other than the battery B may be provided. When an AC load is provided, a subsequent stage of the filter circuit 12b needs to be provided with an inverter circuit or the like in order to generate AC power. The commercial power source which is an AC power source is used, but a DC power source may be used. When a DC power source is provided, the transmitting-side rectifier circuit 1a needs to be removed.

INDUSTRIAL APPLICABILITY

According to the present disclosure, it is possible to determine whether a power-transmitting device and a power-receiving device have a positional relationship in which power is suppliable and to specify a misalignment therebetween.

What is claimed is:
1. A wireless power-supplying system comprising:
a power-transmitting device that transmits power in a wireless manner; and a power-receiving device that receives the power and supplies the received power to a load, wherein the power-receiving device includes
a switch that switches connection to the load, and
a load circuit that is supplied with the power when the switch is in an open state, wherein the wireless power-supplying system includes a control unit that performs a position determining process of determining whether the power-transmitting device and the power-receiving device have a positional relationship in which power is suppliable to the load on the basis of at least one of power, voltage, and current in at least one of the power-transmitting device and the power-receiving device when the power is supplied to the load circuit, wherein the power-transmitting device includes:
a transmitting-side power converter that converts power supplied from the outside into DC power, and
an inverter circuit that converts the DC power from the transmitting-side power converter into AC power, wherein the control unit performs the position determining process on the basis of at least one of power, voltage, and current in the transmitting-side power converter or the inverter circuit, and wherein the control unit calculates transmitting-side input impedance on the basis of a voltage and a current input to the inverter circuit and performs the position determining process on the basis of the transmitting-side input impedance.

2. The wireless power-supplying system according to claim 1, wherein the control unit controls the power-transmitting device so as to output a lower voltage when the load circuit is supplied with power compared to a case in which the load is supplied with power.

3. The wireless power-supplying system according to claim 1, wherein impedance of the load circuit is a rated impedance of the load.

4. The wireless power-supplying system according to claim 1, wherein the control unit calculates input power on the basis of a voltage and a current of a voltage converter or the inverter circuit and performs the position determining process on the basis of the input power.

5. The wireless power-supplying system according to claim 1, wherein the control unit calculates output power on the basis of a voltage and a current of the load circuit and performs the position determining process on the basis of the output power.

6. The wireless power-supplying system according to claim 1, wherein the control unit:
calculates input power on the basis of a voltage and a current of the transmitting-side power converter or the inverter circuit,
calculates output power on the basis of a voltage and a current of the load circuit,
calculates power efficiency on the basis of the input power and the output power, and
performs the position determining process on the basis of the power efficiency.

7. The wireless power-supplying system according to claim 1, wherein the control unit performs the position determining process on the basis of a voltage of the load circuit.

8. The wireless power-supplying system according to claim 1, wherein the control unit performs the position determining process on the basis of a current of the load circuit.

9. The wireless power-supplying system according to claim 1, wherein the control unit determines that the power-transmitting device and the power-receiving device have a positional relationship in which power is not suppliable to the load when the transmitting-side input impedance is greater than an upper limit which is determined on the basis of a withstanding voltage of an element in the wireless power-supplying system.

10. The wireless power-supplying system according to claim 1, wherein the control unit determines that the power-transmitting device and the power-receiving device have a positional relationship in which power is not suppliable to the load when the transmitting-side input impedance is less than a lower limit which is determined on the basis of a heatproof temperature of an element in the wireless power-supplying system.

11. The wireless power-supplying system according to claim 1, wherein the control unit performs the position determining process on the basis of a phase difference between a voltage and a current output from the inverter circuit.

* * * * *